(12) United States Patent
Jones

(10) Patent No.: US 11,022,301 B2
(45) Date of Patent: Jun. 1, 2021

(54) HEATER

(71) Applicant: Joan Philomena Jones, West Sussex (GB)

(72) Inventor: David Mervin Jones, West Sussex (GB)

( * ) Notice: Subject to any disclaimer, the term of this patent is extended or adjusted under 35 U.S.C. 154(b) by 0 days.

(21) Appl. No.: 16/288,530

(22) Filed: Feb. 28, 2019

(65) Prior Publication Data

US 2019/0195488 A1 Jun. 27, 2019

Related U.S. Application Data

(63) Continuation of application No. 14/829,188, filed on Aug. 18, 2015, now abandoned.

(30) Foreign Application Priority Data

Aug. 18, 2014 (GB) ..................................... 1414627

(51) Int. Cl.
*F23C 3/00* (2006.01)
*F28F 1/40* (2006.01)
(Continued)

(52) U.S. Cl.
CPC .............. *F23C 3/002* (2013.01); *F23D 14/12* (2013.01); *F24D 5/08* (2013.01); *F28D 1/0475* (2013.01);
(Continued)

(58) Field of Classification Search
CPC . F23C 3/002; F23D 14/12; F24D 5/08; F28D 1/0475; F28D 7/12; F28F 13/12; F28F 1/40; F28F 21/082; F28F 21/084
See application file for complete search history.

(56) References Cited

U.S. PATENT DOCUMENTS

| 1,335,506 A | 3/1920 | Jones |
| 2,081,612 A | 11/1936 | Woodson |
| (Continued) | | |

FOREIGN PATENT DOCUMENTS

| CN | 101619949 A | 1/2010 |
| DE | 3431435 A1 | 3/1986 |
| (Continued) | | |

OTHER PUBLICATIONS

United Kingdom Intellectual Property Office Search Report dated Feb. 19, 2015, for corresponding application No. GB1414627.8, filed Aug. 18, 2014.
(Continued)

*Primary Examiner* — Jorge A Pereiro
*Assistant Examiner* — Logan P Jones

(57) ABSTRACT

A radiant heater includes a generally U-shaped radiative heating element having a first straight section, a second straight section, and an interconnecting U-shaped section. The non-connected end of the first straight section is arranged for communication with a burner and the non-connected end of the second straight section is arranged for communication with an extractor for extracting combustion gases from the tube. A redirecting element including opposed helical vanes, each executing a 180° turn about a central, common tube, is arranged within the first straight section so as to redirect, in use, at least a portion of the combusted gases flowing within the upper half of the tube towards the lower half, and gases flowing in the lower half towards the upper half.

7 Claims, 23 Drawing Sheets

(51) Int. Cl.
  *F28D 1/047* (2006.01)
  *F28D 7/12* (2006.01)
  *F23D 14/12* (2006.01)
  *F24D 5/08* (2006.01)
  *F28F 13/12* (2006.01)
  *F28F 21/08* (2006.01)
  *F23M 9/08* (2006.01)

(52) U.S. Cl.
  CPC ............... *F28D 7/12* (2013.01); *F28F 1/40* (2013.01); *F28F 13/12* (2013.01); *F28F 21/082* (2013.01); *F28F 21/084* (2013.01)

(56) References Cited

U.S. PATENT DOCUMENTS

| | | | |
|---|---|---|---|
| 2,226,816 A | 12/1940 | Hepburn | |
| 3,827,676 A * | 8/1974 | Brasie | B01F 5/0619 366/337 |
| 4,390,125 A | 6/1983 | Rozzi | |
| 4,529,123 A | 7/1985 | Johnson | |
| 4,869,230 A | 9/1989 | Fletcher et al. | |
| 5,429,112 A | 7/1995 | Rozzi | |
| 5,626,125 A | 5/1997 | Eaves | |
| 6,138,662 A | 10/2000 | Jones | |
| 6,786,422 B1 | 9/2004 | Wortman et al. | |
| 9,791,148 B2 | 10/2017 | Turner et al. | |
| 2003/0188850 A1* | 10/2003 | Liu | F28F 13/12 165/109.1 |
| 2004/0156763 A1 | 8/2004 | Wood et al. | |
| 2009/0277969 A1 | 11/2009 | Briselden | |
| 2011/0079218 A1 | 4/2011 | Wortman et al. | |
| 2012/0203049 A1 | 8/2012 | McCarthy et al. | |

FOREIGN PATENT DOCUMENTS

| | | |
|---|---|---|
| EP | 0248629 A2 | 12/1987 |
| EP | 1267134 A2 | 12/2002 |
| GB | 2145218 A | 3/1985 |
| GB | 2189314 A | 10/1987 |
| GB | 2193305 A | 2/1988 |
| GB | 2292214 A | 2/1996 |
| SU | 1025988 A1 | 6/1983 |
| WO | 9610720 A1 | 4/1996 |
| WO | 9846946 A1 | 10/1998 |
| WO | 2006106345 A1 | 10/2006 |
| WO | 2008036515 A2 | 3/2008 |

OTHER PUBLICATIONS

European Search Report dated Jan. 14, 2016, for European Application No. 15181200.
International Search Report dated Nov. 17, 2015 for International Application No. PCT/GB2015/000245.
Office Action dated Nov. 15, 2017 for corresponding U.S. Appl. No. 14/829,188, filed Aug. 18, 2015.
Final Office Action dated Aug. 18, 2018 for corresponding U.S. Appl. No. 14/829,188, filed Aug. 18, 2015.

* cited by examiner

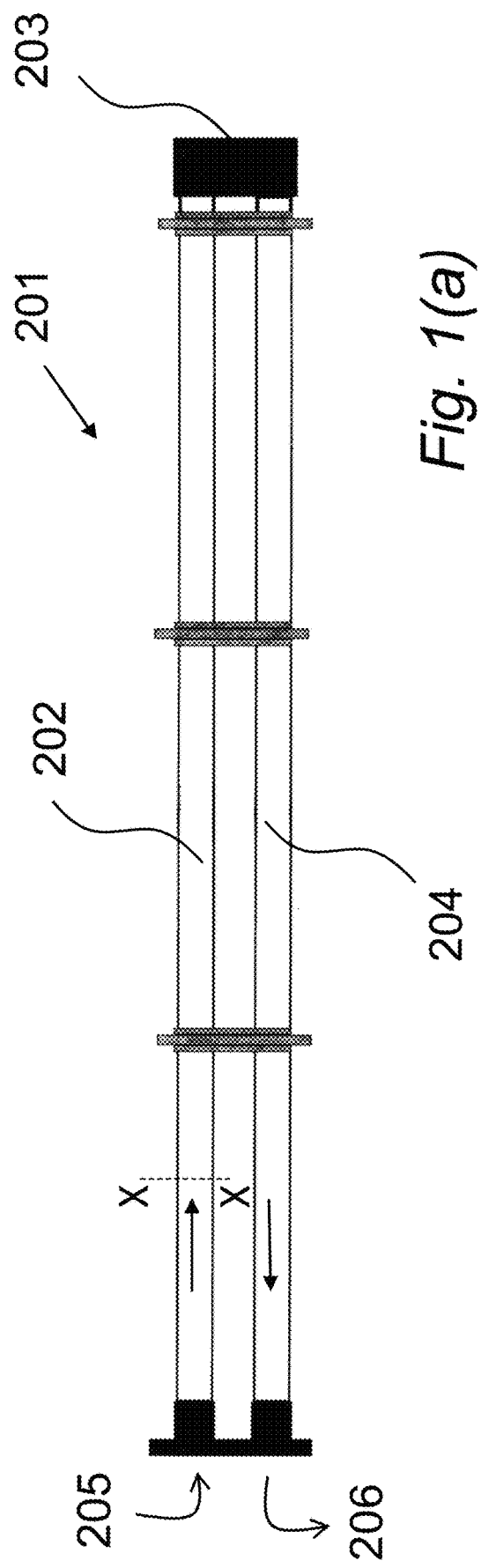
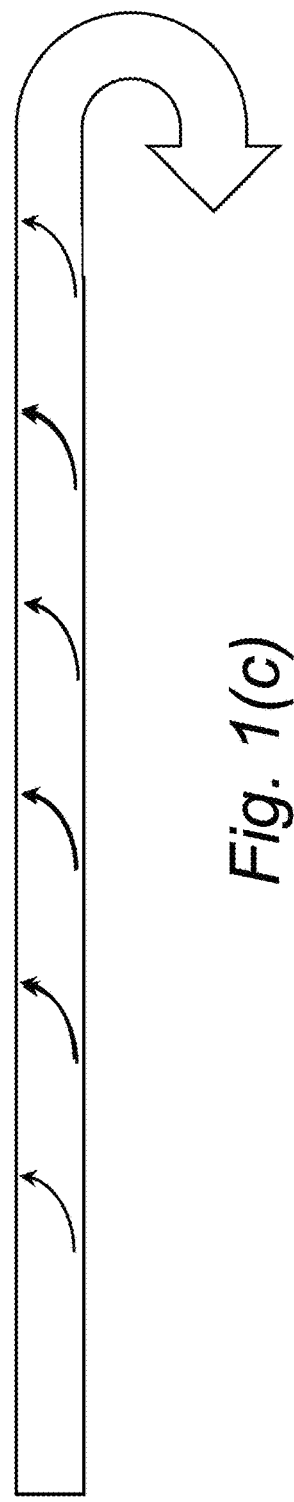
Fig. 1(a)
Fig. 1(c)

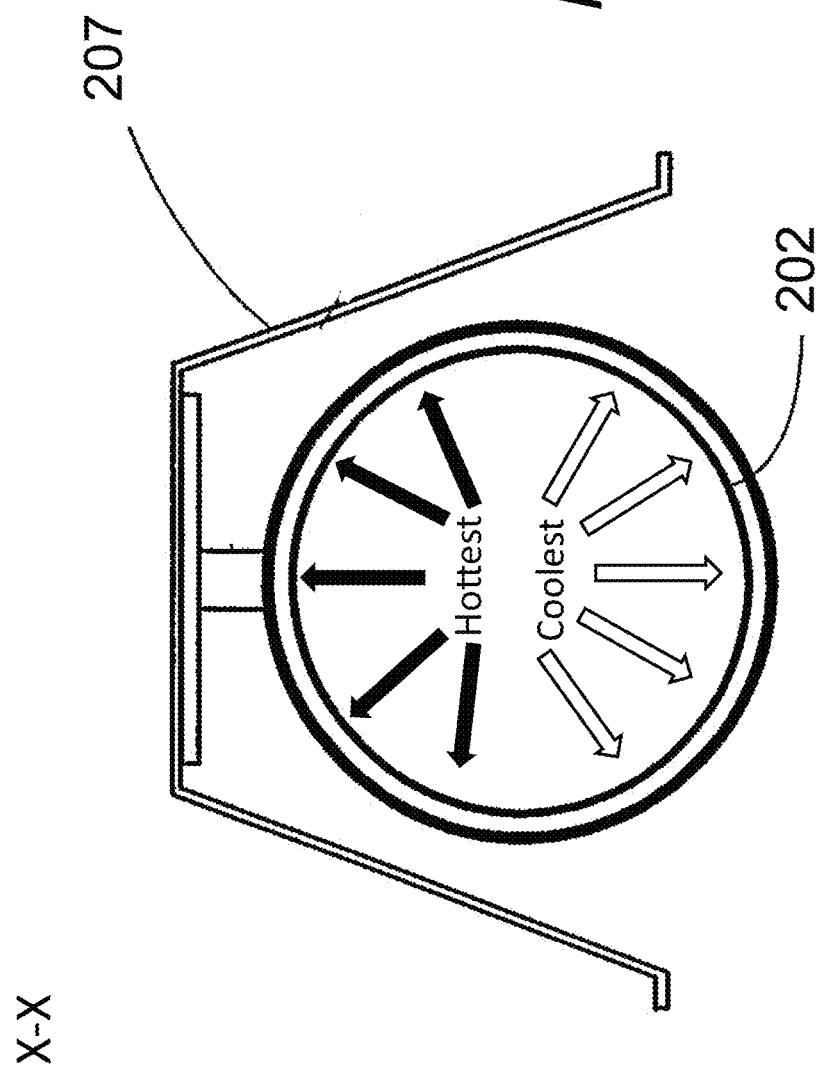

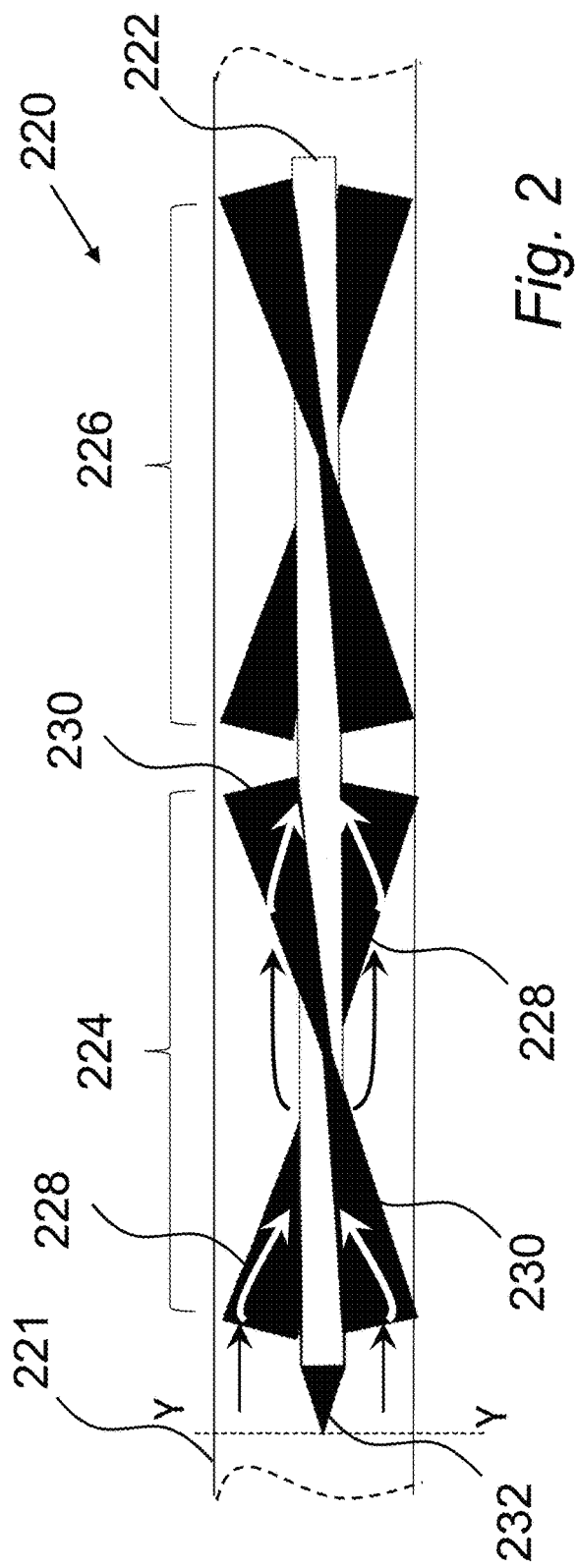
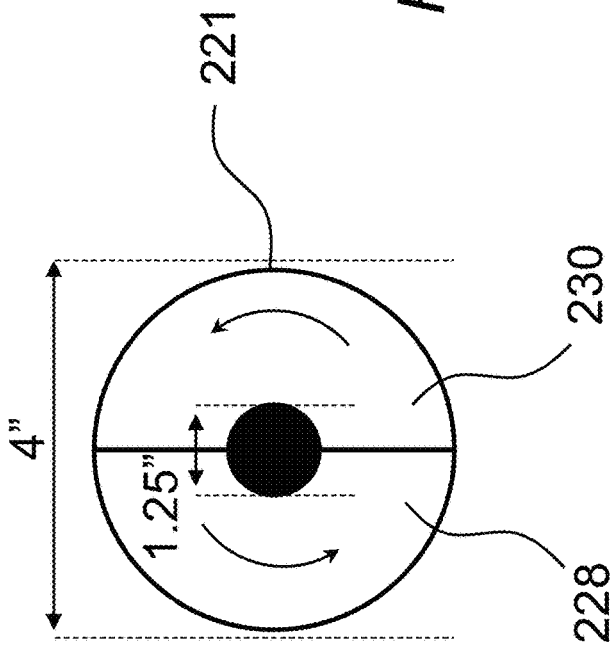
Fig. 2
Fig. 3

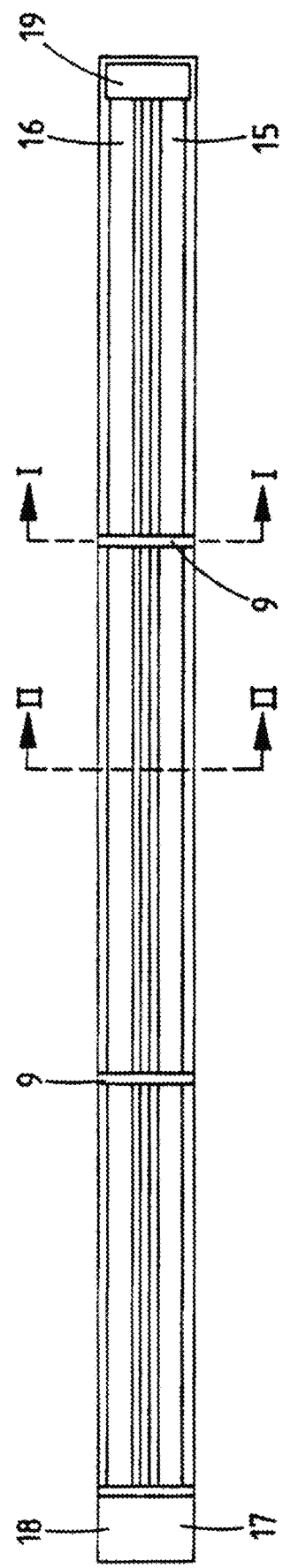
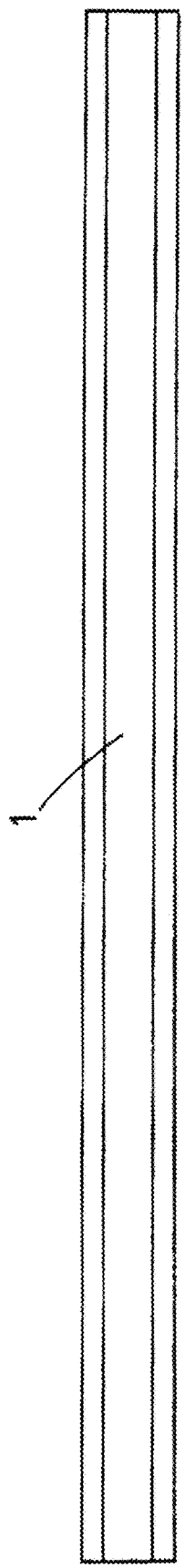
Fig. 8
Fig. 7

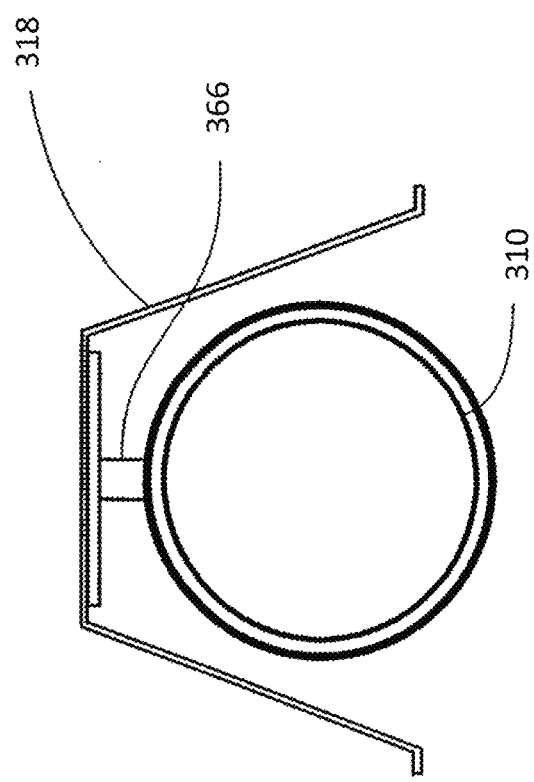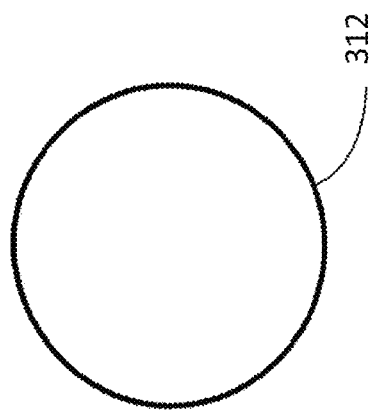
Fig. 25

HEATER

CROSS-REFERENCE TO RELATED APPLICATIONS

This Application is a continuation of U.S. application Ser. No. 14/829,188, filed Aug. 18, 2015, which claims priority to and the benefit of GB Patent Application No. 1414627.8, filed Aug. 18, 2014, the contents of which are incorporated herein by reference in their entireties.

FIELD OF THE DISCLOSURE

This disclosure relates to a heater of the type in which a combustible substance is burnt to release heat. More particularly, the disclosure in this case relates to tubular type radiant heaters, for example for heating industrial buildings such as factories, hangars and other large structures which may comprise of one or multiples of tubes.

BACKGROUND OF THE DISCLOSURE

Such a heater is disclosed in, for example, UK Patent Application Publication No. GB2145218. It is known to heat large buildings, and in particular large industrial high volume buildings by means of radiant output and when used for this purpose consist of a U-shaped radiator system, a burner such as a gas burner being connected to one end of the radiator tube and a fan being arranged at the other end of the radiator tube for extracting combustion gases from the tube. The U-tube may be suspended below a heat reflective housing, which reflects radiation emitted from the tube towards the ground.

Conventional radiant heaters have disadvantages in terms of radiant efficiency, which is the ratio of the amount of radiant flux emitted by the emitter—the radiation source to the energy power consumed by them. Referring to FIGS. 1a and 1b which are, respectively, plan and schematic cross-sectional views of a known radiant heater tube it will be seen that the heater 200 comprises a generally U-shaped heating element 201 which is a burner tube with a first generally straight section 202, a U-shaped bend (not shown) in the housing indicated 203 and a second, generally straight section 204 (sometimes referred to as the return tube) which is parallel to the first section. A gas burner (not shown) is in communication with the first section 202 at position 205 and an extractor fan at position 206 so that, in use, combustion gases are drawn along the tube in the direction indicated. Referring particularly to FIG. 1b, which shows a cross-section at position X-X, the combusted gas has its hottest concentration in the top half of the tube, whereas the bottom half is cooler. The effect is also illustrated in FIG. 1c, which is a schematic side-sectional view of the first section 202, which shows the hotter gases rising to the uppermost area of the tube.

Radiant heat emitted from the top-half, therefore, will require a reflective shield 207 in order to direct this heat towards where it is needed, e.g. the floor of an industrial premises. Although the reflective shield 207 works well, additional gas is consumed to ensure sufficient heat is transferred by radiant means to the below surface.

SUMMARY

A first aspect of the disclosure provides a radiant heater comprising: a radiant heating element in the form of a tube having first and second ends; a burner communicating with a first end of the tube for delivering combustion gases into the tube; an extractor communicating with the other, second end of the tube for extracting combustion gases from the tube; and disposed within the heating element tube, between the first and second ends, a redirecting element arranged so as to redirect, in use, at least a portion of the combustion gases flowing within the upper half of the tube towards the lower half.

By diverting the hotter gases in this manner, it has been discovered by testing that the optimal average temperature can be achieved directly on the lower surface of the tube which is then radiated directly towards the surface below avoiding reflected losses and dispersion losses created by even the most efficient reflector. Less fuel is therefore needed to achieve improved radiant output and therefore reduces heating costs.

The redirecting element may comprise a longitudinally extending vane, or any number of longitudinally extending vanes, with a surface that extends downwards from the upper half into the lower half.

The redirecting element may further comprise a second or any number of longitudinally extending vanes with a surface that extends upwards from the lower half to the upper half.

The first and second type vanes may be arranged diametrically opposite one another, about a common axis.

The or each vane may be substantially helical. The or each vane may make a turn of approximately 180° along its length.

The or each vane may be supported on a longitudinal post that extends centrally within the tube. A spacer may be provided on the post, of substantially the same diameter as the tube's inner diameter, so that the post is aligned centrally within the tube due to the support provided by the spacer. A spacer may be provided at or near one end of the redirecting element post.

The redirecting element may be removably located within the tube, and hence can be retro-fitted to existing heaters, if required.

A plurality of redirecting elements may be provided within the tube. The redirecting elements may be supported on a single longitudinal post, with one end of the post including connecting means to enable said post to be connected to the post of another redirecting element located further down the tube.

The redirecting element may be located within the tube so as to optimise the combustion process The tube may consist of first and second substantially straight sections, generally parallel to one another, connected by a U-shaped tube, the burner communicating with the first straight section and the extractor communicating with the second straight section, wherein the redirecting element(s) is or are disposed in the first straight section.

The heater may further comprising a housing, the underside of which is recessed to receive the radiant heating element which is disposed beneath the housing such that its upper half is wholly within the recess, and at least a portion of its lower half protrudes downwardly from the recess, the recess having a heat reflective surface for reflecting heat radiation from the heating element in a downwards direction. The housing may have a means enabling the attachment thereto of a reflective skirt for focussing the radiation emitted from the radiative heating element.

A further aspect of the disclosure provides a redirecting element or redirecting element assembly constructed and arranged for disposal within a radiant heating element according to any preceding definition.

A still further aspect of the disclosure provides a radiant heater comprising: a generally U-shaped radiative heating element having a first straight section, a second straight section, and an interconnecting U-shaped section, the non-connected end of the first straight section being arranged for communication with a burner and the non-connected end of the second straight section being arranged for communication with an extractor for extracting combustion gases from the tube; and a redirecting element arranged within the first straight section so as to redirect, in use, at least a portion of the combustion gases flowing within the upper half of the tube towards the lower half.

The redirecting element may comprise one or more fixed, helical vanes so that, in use, combustion gases flowing within the lower half of the tube are also redirected towards the upper half to create a swirling effect within the first straight section as the gases travel between the burner end and the 'U' Bend.

A further aspect of the disclosure comprises a method of providing a heating element, comprising: providing a heating element formed of first and second detachable tube sections between the burner and the 'U' Bend; separating the first and second sections to reveal an opening in each section; inserting a redirecting element within at least one of the sections through its opening, the redirecting element comprising a support member carrying at least one curved vane which in use is arranged to re-direct a combusted gas travelling through the tube section from an upper region to a lower region; and reconnecting the separated first and second sections.

BRIEF DESCRIPTION OF THE DRAWINGS

The will now be described, by way of non-limiting example, with reference to the accompanying drawings, in which:

FIGS. 1a-c show different schematic views of a conventional radiant burner tube, which is useful for understanding the present disclosure;

FIG. 2 is a partial cross-sectional view of a first tube portion incorporating a re-directing element according to an exemplary embodiment of the present disclosure;

FIG. 3 is a cross-sectional view of the FIG. 2 tube portion along axis Y-Y;

FIG. 5 is a detailed view of a connector portion shown in FIG. 4;

FIG. 8 is a plan view from below of the embodiment of FIG. 7;

FIG. 25 is the view of FIG. 20 showing the deflector assembly.

DETAILED DESCRIPTION OF ILLUSTRATIVE EMBODIMENTS

Figure 4:
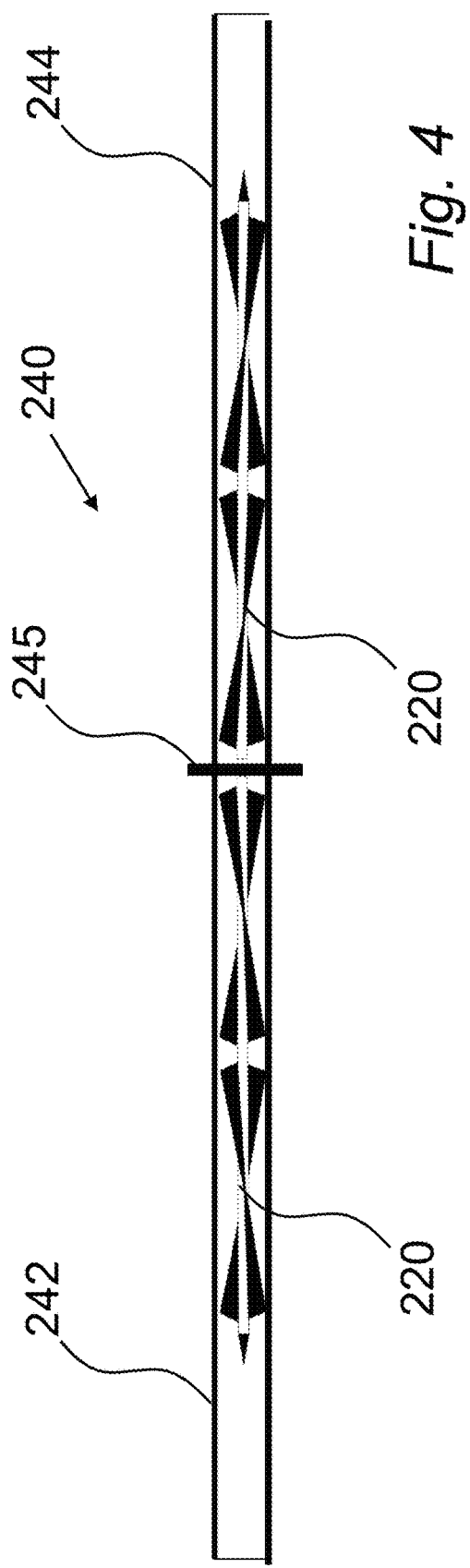
FIG. 4 is a longitudinal cross-sectional view of the FIG. 2 tube portion.

Embodiments herein relate to radiant heaters of the type shown in FIG. 1a, namely radiant heaters formed with a generally U-shaped heating element which is a mild-steel tube formed of first and second straight sections with an interconnecting U-bend. A gas burner and an extractor fan are provided so that, in use, combustion gases are drawn along the tube in the direction indicated.

Applicant has determined that a the highest efficiency radiant output and transfer to below surfaces is in the low radiant temperature band, at or near 450° C., which delivers a figure approaching 100% radiant output. Measurement of this temperature is usually made at or near the U-bend part of the heating element, which represents the location of average tube temperature.

In a conventional radiant heater, due to the previously-mentioned tendency for hot gases to travel along the upper level of the tube (due to the convective behaviour of the flame, typically operating at 1100° C.) temperatures are typically well-above 450° C. in the upper half of the tube and well below this temperature in the lower half, when measured at the U bend. As a consequence, radiant output relies heavily on the use of a reflector positioned above the heating element. This requires more fuel to achieve the required heating to surfaces below.

In the present embodiments described herein, however, a redirecting element is provided, either fixed or removable within at least the first straight section, i.e. that which communicates with the gas burner. The redirecting element provides a form of disruptive burner technology (DBT) in that it disrupts the gas flow, redirecting it to where it can be of better service to increase overall radiant output efficiency. The redirecting element is arranged in use to redirect the travel of combusted gas from the upper half of the tube to the lower half, and preferably still, to create a swirling effect, effectively replicating a turbine engine effect (in reverse) so that the hotter gases which naturally tend towards the upper half of the tube are redirected downwards, and the cooler gases upwards.

To achieve this, a first embodiment provides a redirecting element assembly 220 to be described below.

A first embodiment redirecting element assembly 220 is shown in FIG. 2, and comprises a longitudinal post 222, which can be hollow in order to be lightweight and cost-effective to manufacture, supporting a pair of identical redirecting elements 224, 226. The redirecting element assembly 220 is shown located in fixed relation inside a first straight section 221 of a U-shaped heating element. Each redirecting element 224, 226 comprises a pair of opposed vanes 228, 230 each providing a curved surface extending helically around the post 222 as shown. The fore end of the post 222 has a cone 232 arranged in use to urge gases being drawn towards the first redirecting element 224 outwards to the vanes 228, 230. As shown in FIG. 3, which is the end view of the first redirecting element 224, the terminating edges of the vanes 228, 230 are vertically oriented within the first straight section 221, with the first vane being arranged in use to redirect the hotter gases from the upper region of the tube downwards and the second vane arranged in use to redirect the cooler gases upwards. The longitudinal extent of each of the vanes 228, 230 is a half-pitch helix, providing a turn angle of 180°, or thereabouts, to generate a vortex or swirling effect within the tubular section 202. This swirling travel of the combusted gases is continued by the adjacent redirecting element 226, arranged downwards of the first redirecting element 224 on the post 222.

In the example shown in FIGS. 2 and 3, the diameter of the post 222 is substantially 31.75 mm (1.25 inches) and the outer diameter is 101.6 mm (4 inches.)

In some embodiments, the redirecting element assembly 220 may support just one redirecting element, or more than two redirecting elements. The redirecting element assembly 220 may comprise alternative vane configurations in terms of sloping or curved surfaces in order to cause the swirling effect.

FIG. 4 shows two such redirecting element assemblies 220 within the first straight section 221 of a radiant heater heating element. It will be appreciated that the heating element will also comprise a U-bend and a second (return) straight section which communicates with an extractor fan in the manner indicated previously with reference to FIG. 1a.

In this embodiment, the tubular section 221 is divided into two parts 242, 244 which are connect using a connector 245. Each redirecting element assembly 220 is mounted within the parts 242, 244 first by disconnecting the parts, inserting each assembly within the disconnected tubular ends, and then re-connecting the parts 242, 244. The dimensions of each redirecting element assembly are such that they are fixedly mounted 635 mm (25 inches) from the external ends of the tubular section 221. Each redirecting element assembly 220 is 245.1 mm (96.5 inches) in length, meaning the combined length within the tubular section 240 when joined is 4902.20 mm (193 inches). The overall length of the tubular section 240 is therefore 6172.20 mm (243 inches.) These figures are approximate and it will be appreciated that some deviation either side is possible. Nevertheless, the stated dimensions, and particularly the spacing from the ends to the redirecting element assemblies 220, appear in testing to produce excellent results in terms of heat distribution and therefore efficiency.

Referring to FIG. 5, which is a close-up view of the connected region, it will be seen that the far-end of each post 222 (the end opposite the cone end 232) is mounted within the connector 245. For the avoidance of doubt, the redirecting element assemblies 220 are fixed and do not rotate relative to the tubular section 221. All fittings are stainless steel.

Figure 6:
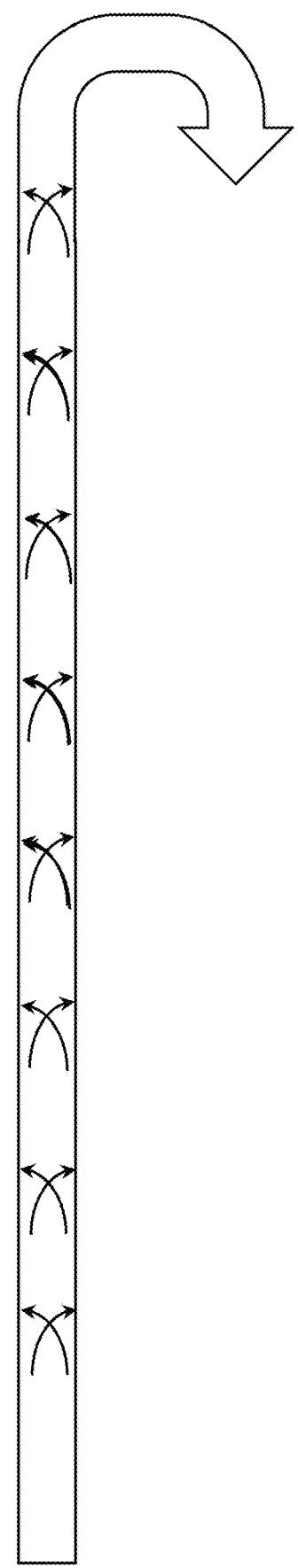
FIG. 6 is a schematic longitudinal view of gas travel in the FIG. 4 tube portion.
Figure 7:
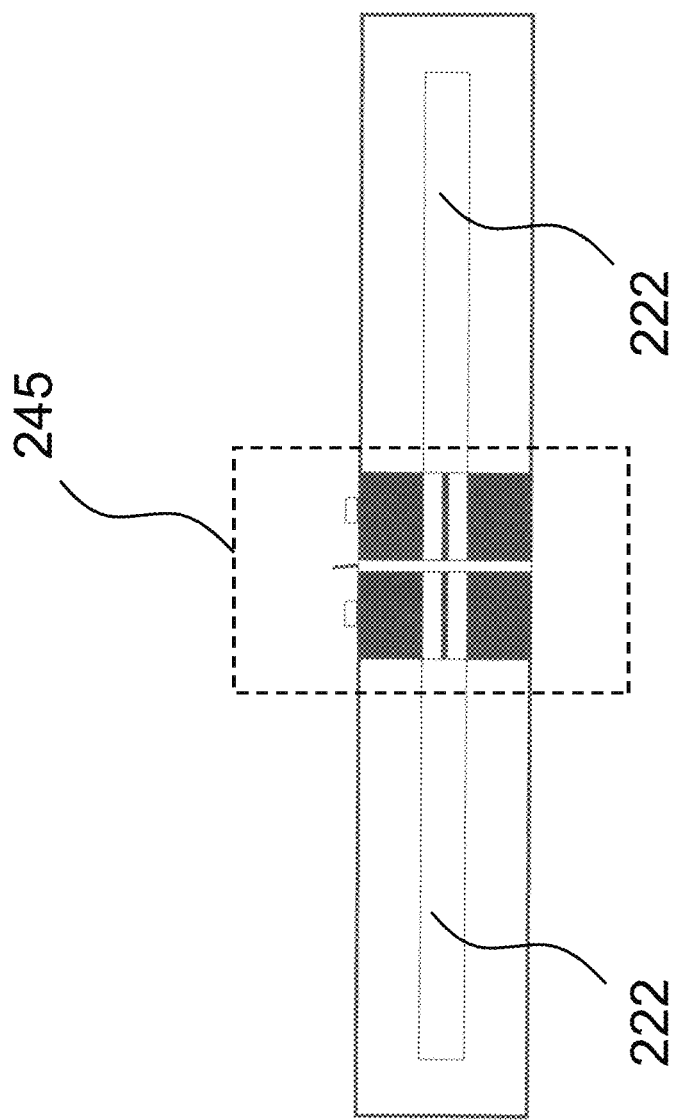
FIG. 7 is a plan view from above of a radiant heater according to a further embodiment of a known heater which can incorporate a re-directing element according to an embodiment of the present disclosure.

FIG. 6 indicates schematically the effect of redirecting the combusted gas around the tubular section 240 by means of the redirecting element assemblies 220. The hotter gases no longer run along the top of the tubular section 240 due to the spoiling effect of the redirecting element assembly 220. This replicates a reverse turbine engine effect, whereby pressure is created by the hot combusted gases expanding, which is then used to increase power. The redirecting elements 224, 226 (which are fixed, in series) create pressure and efficiently exploit the travel of combusted gas by disrupting the natural flow of the highest temperature gas to scrub the optimum output area of the tube, which is on the lower half (effectively between the 4 and 8 o'clock positions if referenced to a clock face on the cross-section). The effect of this is to raise the average temperature at this lower half to (or towards) the optimal 450° C. at the U-bend, delivering direct radiant heat to surfaces below, and also requiring less gas than the conventional radiant heater system to achieve this.

Furthermore, a radiant heater using such redirecting element assemblies 220 offers a cleaner combustion process, with little or no carbon monoxide or sulphur dioxide being produced, removing or reducing the need to provide an extracting flue to discharge these gases to the atmosphere.

For completeness, we now describe further embodiments which relate to radiant heater technologies provided by the Applicant, as disclosed in published patent application numbers WO96/10720 and W06/106345, the disclosures of both of which are incorporated herein by reference. Whilst the drawings and related descriptions do not explicitly show or describe the use of such redirecting elements or redirecting element assemblies 220, it will be appreciated that it is straightforward to apply such redirecting element or redirecting element assemblies into the existing heaters, e.g. at manufacture or by retro-fitting, and so these are described to indicate forms of radiant heater assembly within which such redirecting element and redirecting element assemblies 220 can be added in order to provide the benefits in terms of efficiency. Certain features shown in relation to these additional embodiments may or may not be required as a result of the improved radiant efficiency obtained.

The disclosure of WO96/10720 will first be introduced. Referring to FIGS. 7 to 10, it can be seen that in one such embodiment, the radiant heater comprises a housing generally designated 1 having an outer wall 2 formed of mild steel and formed so as to have a generally horizontal region 2a and downwardly divergent portions 2b and 2c.

Figure 9:
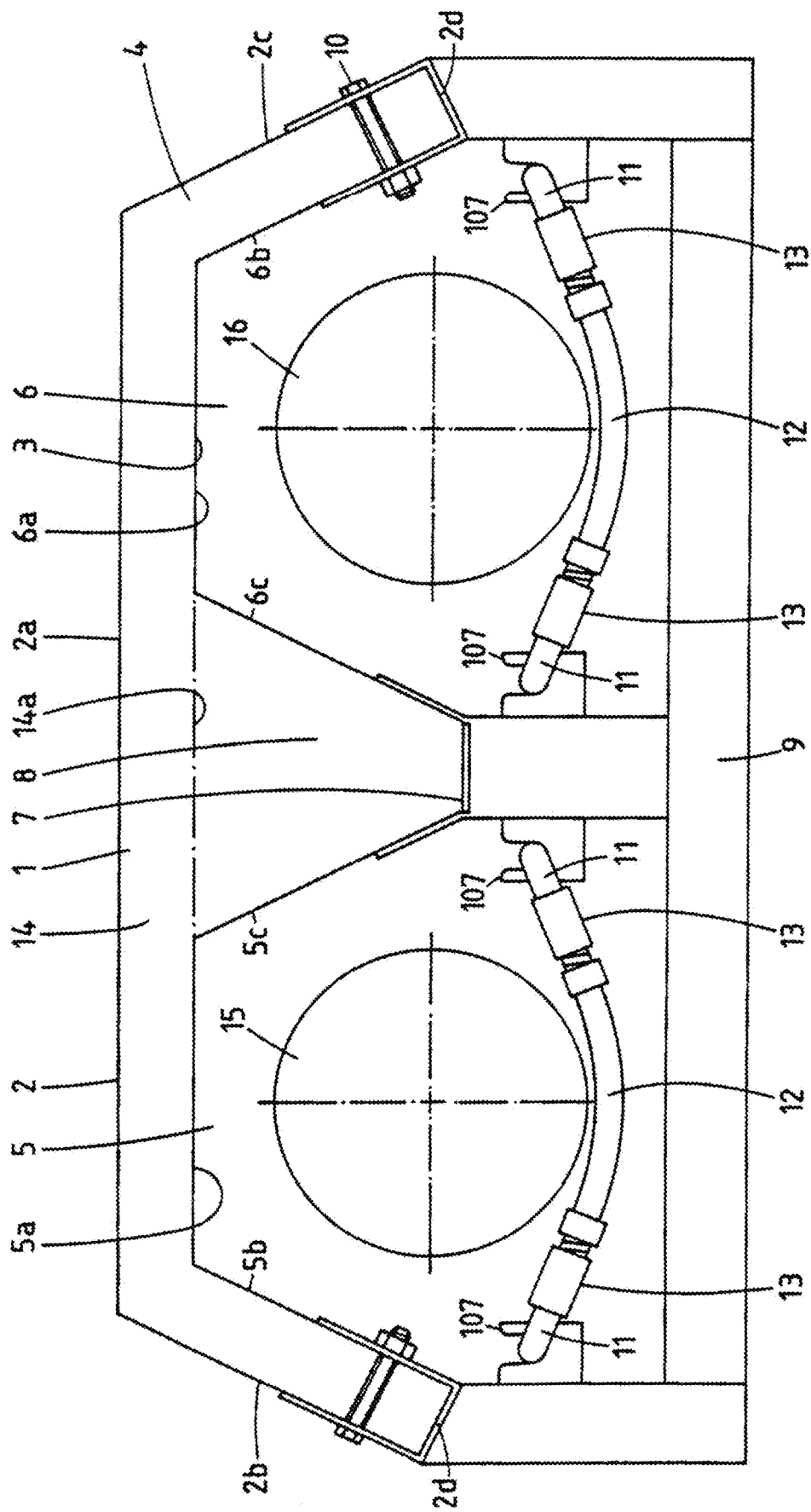
FIG. 9 is a sectional elevation along line I-I in FIG. 8.

Secured to the outer wall 2 by means of riveted joints at location 2d is an inner wall 3, formed of bent aluminium sheet, the downwardly facing surface of which has been anodised, and preferably provided with gold colour. Inner wall 3 is shaped so as to define two downwardly open sub channels 5 and 6, each of the sub-channels having an upper reflective surface 5a, 6a, and downwardly divergent lateral reflective surfaces 5b, 5c, 6b, 6c. Surfaces 6c and 6c, together with a linking lower wall 7 form a central barrier portion 8, the function of which will become apparent from the following description. At spaced (e.g. one metre) intervals along the housing, brackets 9 are secured to the housing. Bracket 9 is illustrated in FIG. 9, where it can be seen that the bracket has a generally horizontal cross-bar portion 101 formed of box section steel and, secured thereto, by means of bolts 102, a generally upright member 103 at the upper ends of which are secured attachment brackets 104 of channel section. At the mid-point of the cross-bar portion 101, is secured, by welding, a short transversally mounted piece of steel box section 105 from the upper corners of which extend divergent arms 106, which in use are arranged to embrace, but are not fixedly attached to, the central barrier portion 8 of the housing. The bracket is secured to the housing by means of mounting fixtures 104 which fit over the lower edges of the housing and are secured in place thereon by means of bolts 10.

The brackets 9 are provided with inwardly facing pairs of hook elements 107 which engage the retaining rings 11 on the respective ends of tube-supporting cables 12.

Tube-supporting cables 12 are typically formed from a flexible high temperature resistant metallic material such as steel, and are provided with screw adjusters 13 formed from a non-ferrous metal such as brass which allow the cables 12 to be shortened or lengthened. Burner tubes 15 and 16 rest loosely on the cables 12 and, as will be appreciated, the height of the tube within the housing may be varied by shortening or lengthening the supporting cables 12.

The burner tubes 15 and 16 extend along the channel from one end of the housing to the other, tube 15 being connected at one end 17 with a gas burner (not shown) which heats the interior of the tube. Combustion gases are drawn along the tube from the burner 17 via a U-bend (not shown) at location 19 and into the return tube 16 by means of an extraction fan (not shown) mounted at end 18.

The tubes 15 and 16 are formed from steel, and may be surface treated to maximise their radiative efficiency. In use, the tube 15 is heated by means of the gas burner and then functions as a radiator heating element, with radiation from the surface of the tube being reflected by reflective surfaces 5a, 5b and 5c in a downwards direction.

Tube 16 also gives out radiation, but to a lesser extent since the tube is somewhat cooler than tube 15.

In order to prevent conductive and convective losses through the upper surface of the housing, a layer of insulation 14 is disposed between the inner and outer walls. The layer of insulation 14 fills the space between the inner 3 and outer 2 walls except at location 14a, where the surface 14a of the insulating material, together with walls 5c and 6c of the central barrier portion 7 define a hollow channel running along the length of the housing.

The thermal insulating material is selected so as to be resistant to the operating temperatures of the heater, and for example may be selected so as to resist temperatures of 600° C. and above.

Figure 10:
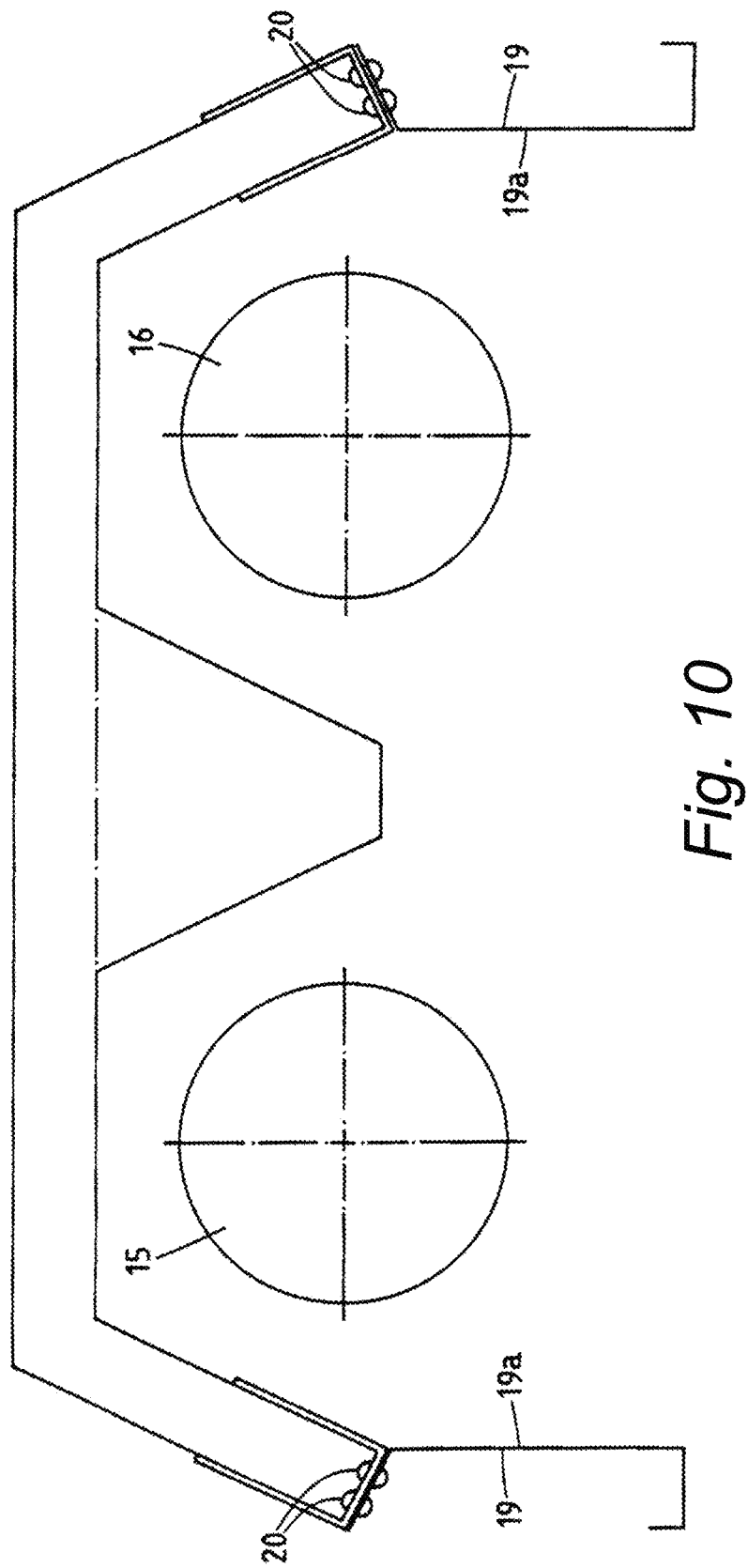
FIG. 10 is a sectional elevation along line II-II in FIG. 8.

As illustrated in FIG. 10, the housing has secured to the lower edges thereof a reflective skirt comprising side panels 19 having inwardly facing anodised aluminium reflective surfaces 19a. Panels 19 are secured to the housing by means of rivets 20 and are also mounted on, and held rigidly in place by, brackets 9. The reflector skirt 19 serves to focus and reduce the angle of spread of radiation from tubes 15 and 16.

The reflective skirt 19 may be replaced by reflector skirt 21, 22, 23 or 26 as illustrated in any one of FIGS. 11 to 14 in order to vary the angle of spread of the radiation from the heater tubes. For example, when it is necessary to mount the heaters at a higher point within a building, e.g. as a result of the roof or ceiling support structure or other available supporting structures being much higher above the ground, a longer reflective skirt as illustrated in FIG. 6 may be employed to reduce the spreading of the radiation thereby to provide the desired radiative flux density at ground level. Conversely, where it is necessary to mount the heaters at a lower point in a building, the reflective skirt shown in FIG. 10 may be replaced by the shorter reflective skirt shown in FIG. 11.

Figure 11:
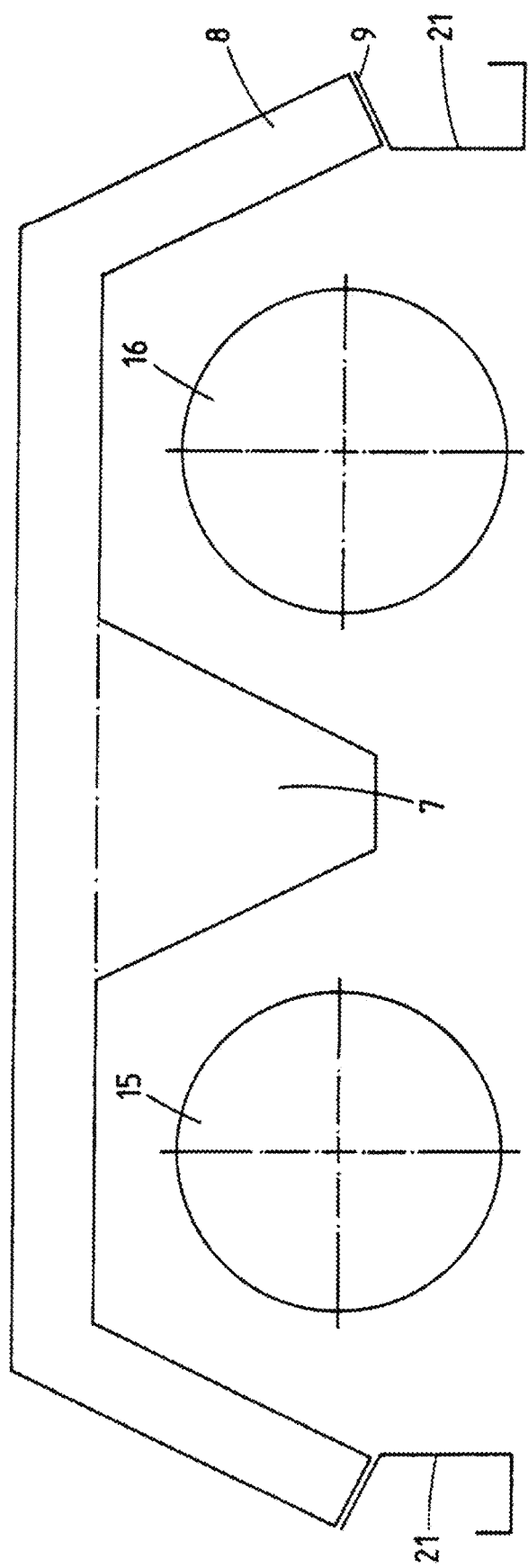
FIGS. 11 to 14 illustrate the embodiment of FIGS. 7 to 10, but with varying reflective skirt configurations.
Figure 12:
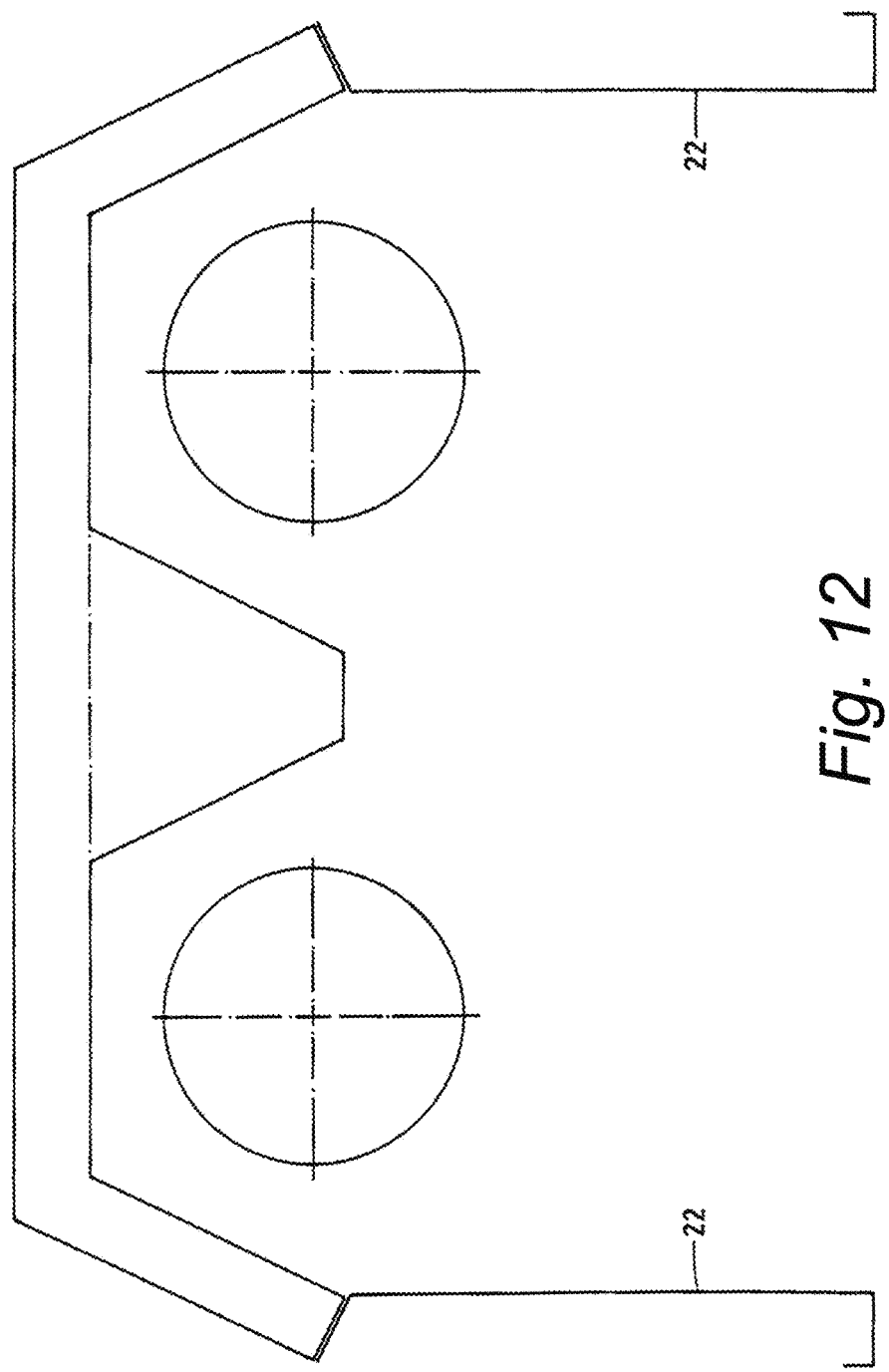
Figure 13:
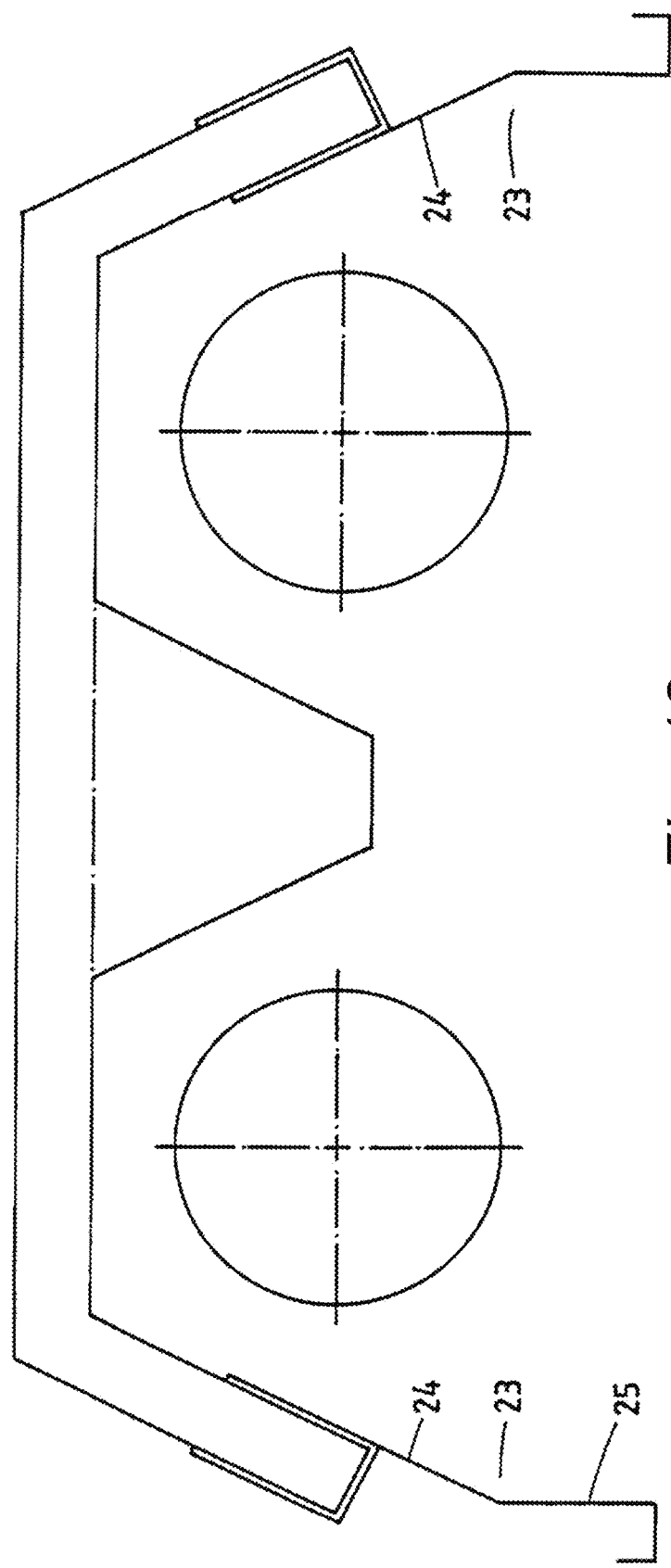
Figure 14:
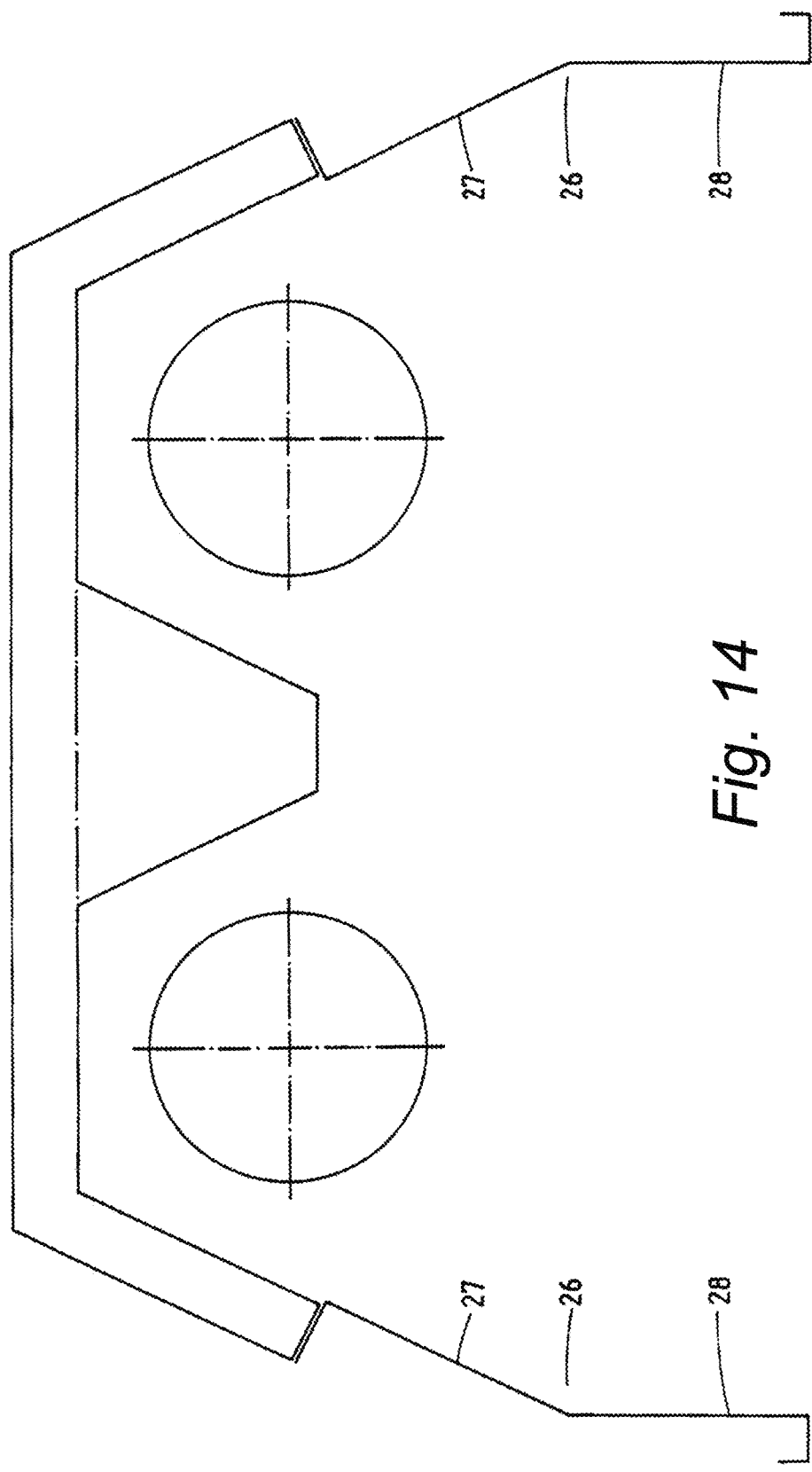
Figure 15:
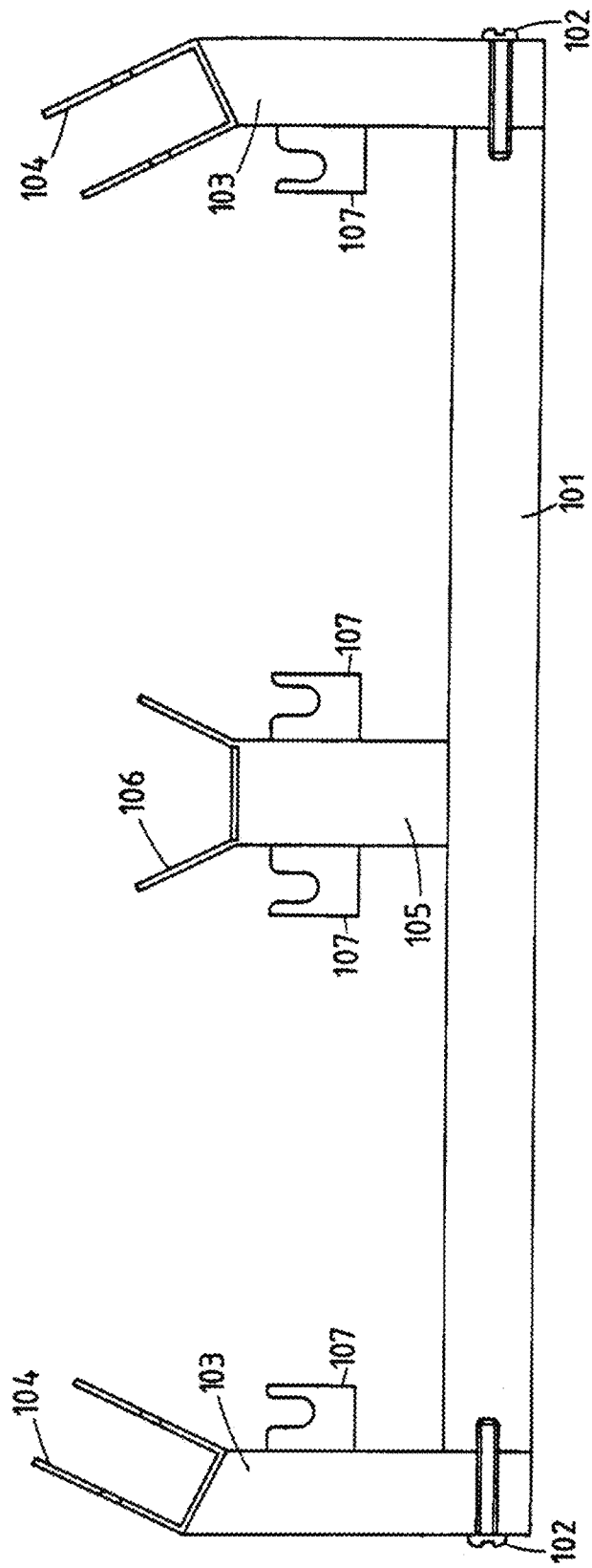
FIG. 15 is a sectional elevation of the bracket shown in FIG. 9.

In FIGS. 11 and 12, the reflective skirts are shown as having generally parallel downwardly extending walls, but they may also, for example, be inclined, as illustrated in FIGS. 13 and 14, where the upper parts 24 and 27 respectively of the reflective skirts are divergent and follow the lines of the housing, and the lower parts 25, 28 of the reflective skirts 23, 26 respectively are substantially parallel.

When designing a heating system for a building incorporating the radiant heaters of embodiments of the present disclosure, the building floor area A is first measured and the desired temperature rise AT above ambient is selected. From the floor area A and AT, the required radiant flux density 9 at floor level is then determined. Taking into account the height at which the heaters are to be suspended within the building, and taking into account also the shape of the floor area, an array of heaters is then chosen, each heater having a reflective skirt of the appropriate configuration to provide the desired radiant flux density at its given location in the building. As will be appreciated, the configuration of a reflective skirt for a heater in a corridor, alcove or bay would be different from the configuration of the reflective skirts on heaters in the main hall of a building.

An advantage of the embodiments shown in FIGS. 7 to 12 specifically set forth above is that they provide a basic radiant heater which can readily be adapted to provide the desired radiant flux density at a given location in a building by selecting an appropriately shaped reflector skirt. The radiant heaters according to this embodiment thus offer significant advantages over presently available radiant heaters which tend to be of fixed configuration and do not have the facility for modification in the manner illustrated above.

Figure 16:
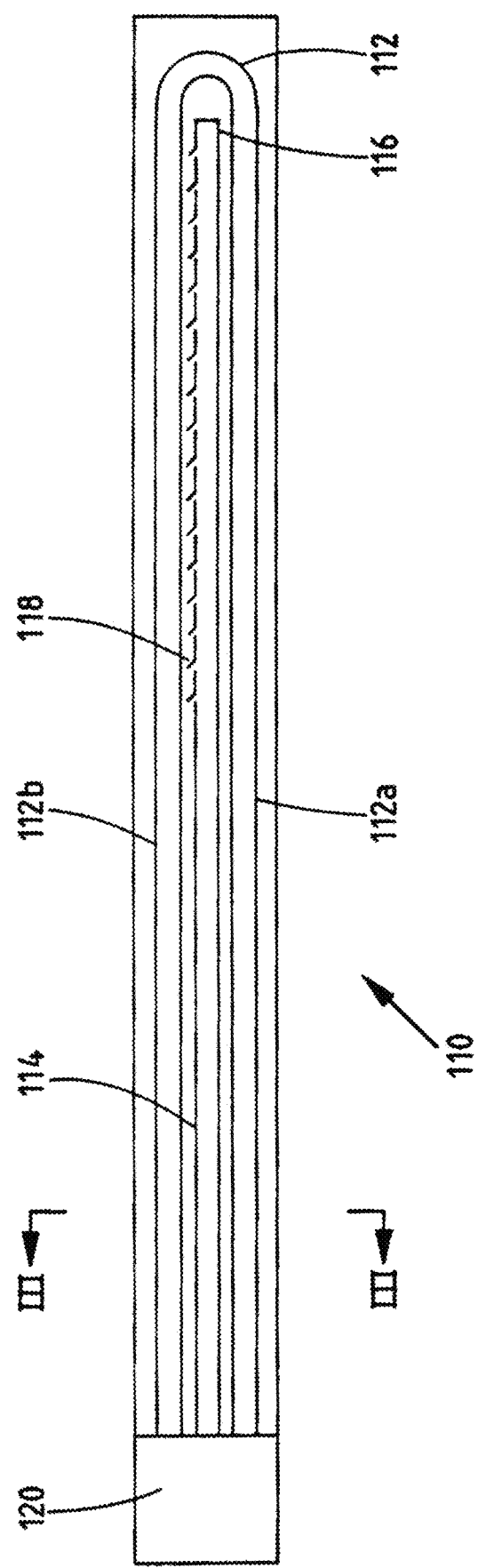
FIG. 16 is a view of a heater according to a further embodiment of a known heater from the underside.

A further aspect is exemplified by the heater illustrated in FIG. 16. The heater 110 comprises a substantially U-shaped heater element 112 comprising a pair of linked generally parallel heater tubes 112a and 112b. Between the tubes 112a and 112b is a flow passage 114 having a closed distant end 116 lying in the base of the U defined by the heater tube 112.

Louvres 118 are provided on the side of the flow passage 114 facing tube 112b, along roughly one-third of the length of the flow passage 114 nearest its distant end 116. The ends of the tubes 112a, 112b and flow passage 114 are enclosed in a compartment 120. The interior of the compartment 120 is shown in more detail in FIG. 18, described later.

Figure 17:
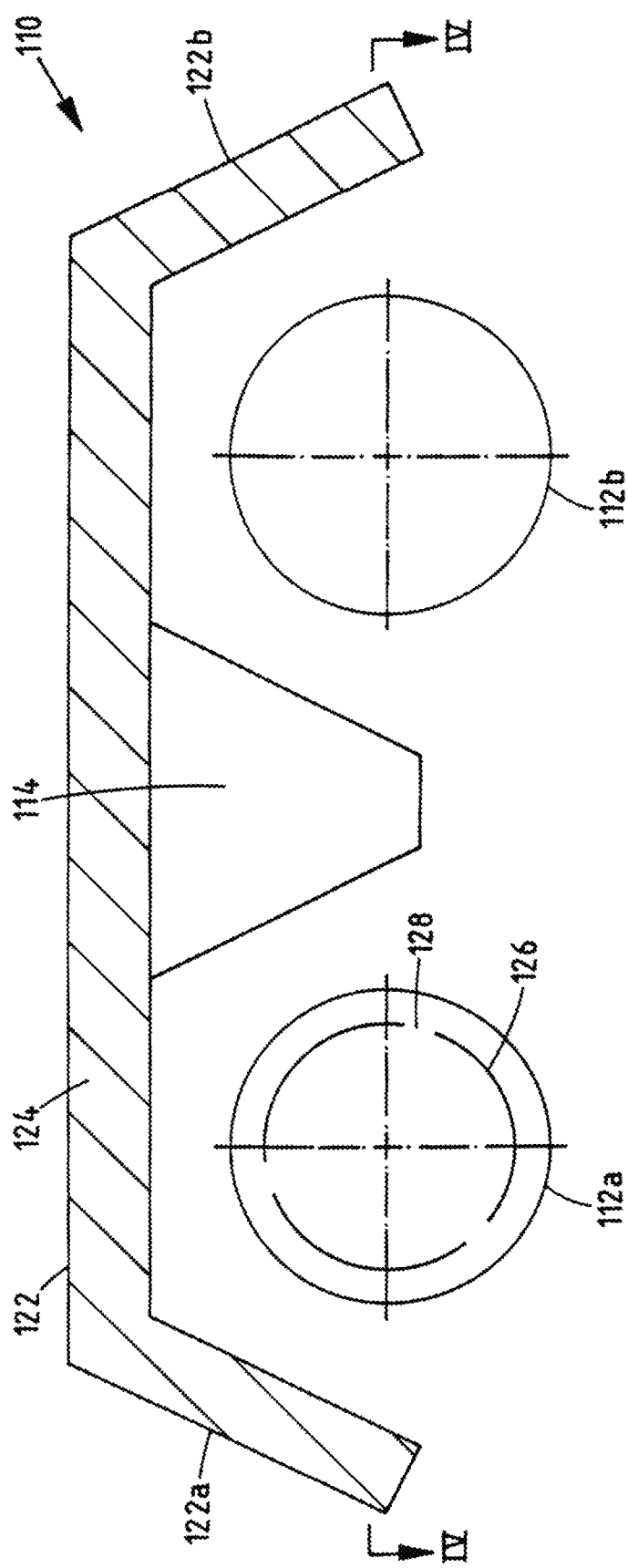
FIG. 17 is a section on III-III of FIG. 16.

FIG. 17 shows the heater in cross-section. It can be seen that the outer casing 122 comprises a generally hollow section filled with an insulating material 124. The casing 122 has side walls 122a, 122b. Suspended from the casing 122 is a hollow truncated V-section, which forms the flow passage 114 and which runs along the length of the casing 122. Thus, the casing 122, side walls 122a and 122b, and flow passage 114 between them define two elongate regions. Within these elongate regions are suspended the heater tubes 112a and 112b respectively. The suspension is achieved by a suspension, not shown in FIG. 17.

This can be as shown in the embodiments of FIGS. 7 to 15.

FIG. 17 also shows that tube 112a has an inner liner tube 126 which lies generally concentrically within tube 112a and is perforated by perforations 128.

Figure 18:
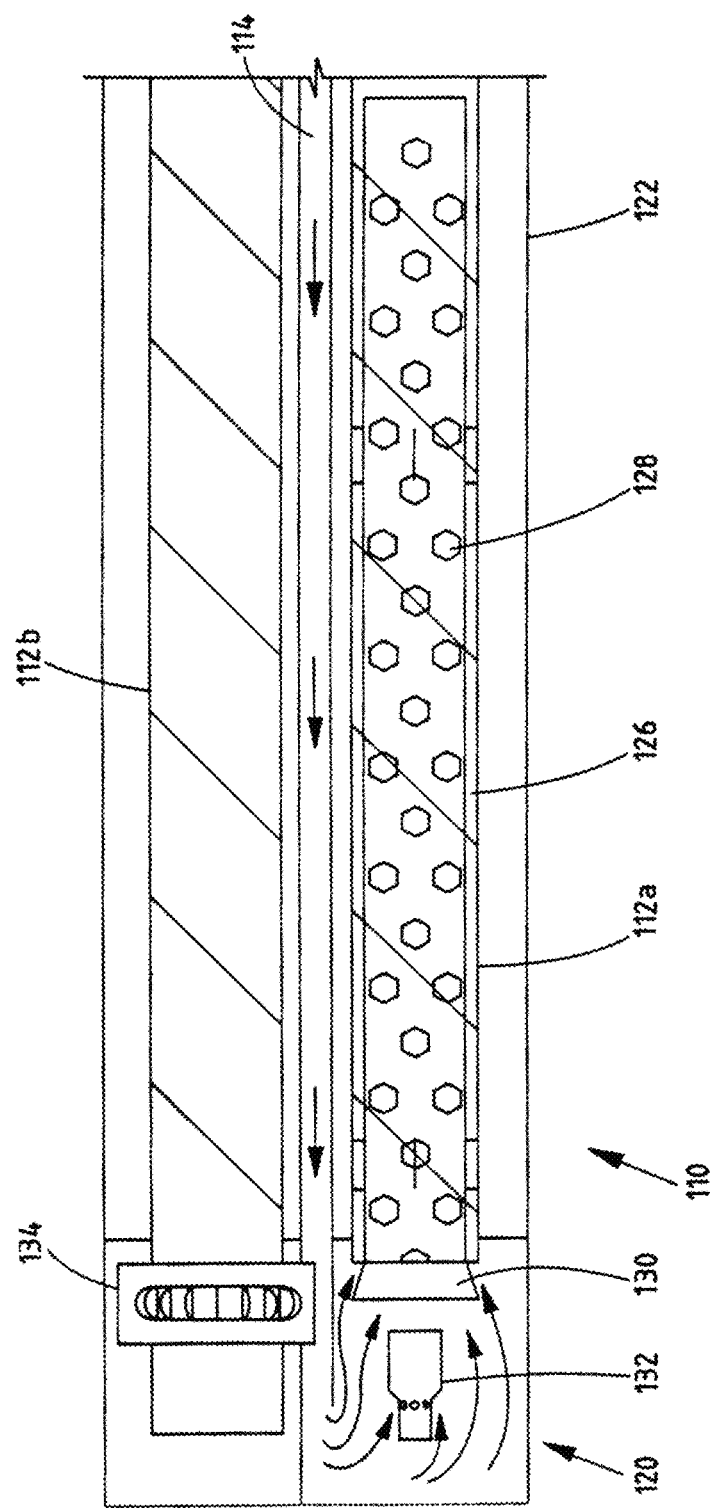
FIG. 18 is a partial cross-section on IV-IV of FIG. 17, and as such is an enlarged, partially sectional view of the inlet portion of FIG. 16.

Referring to FIG. 18, this shows the region about the enclosure 120 into which project the heater tubes 112a and 112b. Heater tube 112a can be seen to contain the inner liner tube 126 along part of its length, although both the inner liner tube 126 and heater tube 112a are coterminous at an open end within the enclosure 120. Inner liner tube 126 is, as previously mentioned, perforated by perforations 128. At the open end, the inner liner 126 is provided with a flared inlet 130. Facing the inlet 130 is a burner 132 supplied with fuel. Burner 132 is a standard item.

The heater tube 112b has an open end extending into the enclosure 120, where it is connected to a suction fan 134 which is arranged to extract gas from the heater tube 112b and vent it to atmosphere through a vent not shown in FIG. 18.

The interior of the enclosure 120 is partitioned to prevent gas flow between the free ends of the heater tubes 112a and 112b. The flow passage 114 communicates with the region into which tube 112a projects.

Figure 19:
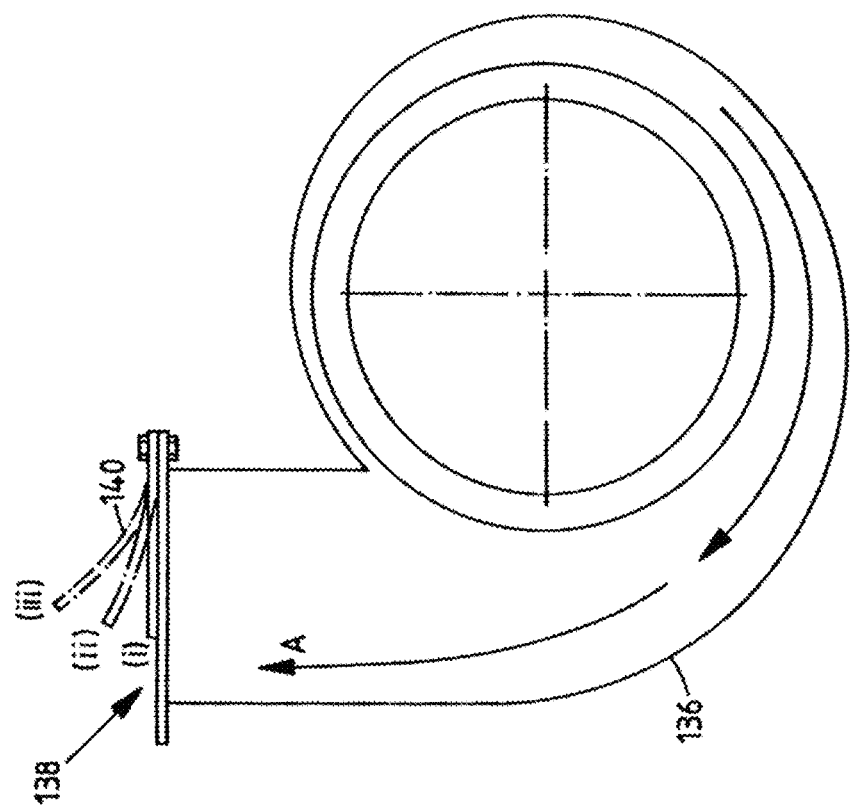
FIG. 19 is a diagrammatic illustration of the air vent of FIG. 18.

FIG. 19 shows the vent 136 of the suction fan 134.

The vent 136 has an opening 138 which is partially covered by a bimetallic element 140. When air being expelled from the vent 136 through the opening 138 is cool, the bimetallic strip 140 is flat and is in position (i), almost completely covering the opening 138. Thus, the flow out of the vent 136 is restricted. As the temperature of gas flowing out of the opening 138 increases, the bimetallic element 140 bends away from the opening 138 through position (ii) and progressively into position (iii), thus reducing the restriction on flow and allowing more gas to pass.

It can be seen that in general, only part of the opening 138 is uncovered at any one time, but in the generally spiral outlet employed in this embodiment, this does not matter because escaping gas generally follows the route shown by arrow A. Thus, a greater proportion of escaping gas passes through the outer third of the outlet 138 and hence in its fully withdrawn position (iii) the bimetallic element 140 allows a sufficient volume of gas to pass.

The operation of the heater 110 of the present disclosure is generally as follows. The suction fan 134 draws air along the tube 112b, around the U-bend in the heater tube 112, and hence along the tube 112a. Thus, there is a negative pressure in the region of the burner 132. For this reason, air is drawn along the flow passage 114, being supplied to the passage via louvres 118. Since the louvres face the heater tube 112b, air will be drawn from the vicinity of that tube. Once the heater is running, air will remain in the elongate space surrounding the tube 112b through convection, and therefore can be expected to flow into the louvres 118 from along the entire length of the tube 112b.

Once it reaches the burner 132, air mixes with fuel and is ignited when it passes into inlet 130. Inlet 130 ensures that all flames pass into the inner liner 126, where they are fed with secondary air flowing from the space between the inner liner 126 and the burner tube 112a via perforations 128. Hence, inner liner 126 protects the burner tube 112a from the extreme temperature of the flames in the vicinity of the burner 132. However, since the temperature of the flame will decline along the length of the burner tube 112, the inner liner 126 is not required along the entire length and hence is shorter than the burner tube 112.

Inevitably, the tube 112a will be hotter than the tube 112b, and these two tubes will themselves have a graduated temperature there along. However, the provision of the tubes in a U-formation means that, along the length of the heater, the average temperature of the two tubes remains substantially constant. Thus, the total radiative output of the heater is substantially constant along its length.

In addition, the end of the tube 112b nearest the suction fan 134 will be at such a low temperature that its radiative efficiency will be very low compared to the equivalent portion of the burner tube 112a. However, this is not a problem in the present disclosure since the air around tube 112b, which would normally escape through convection without contributing to the radiative power of the heater, is instead drawn alongside tube 112b, through louvres 118, and used as pre-heated combustion air.

The heater 110 is able to reach its operating temperature more quickly, due to the temperature-dependent restriction on the outlet 136, described above. Thus, when fully cold, the heater operates in a fuel-rich state in which there is little air (by volume) flowing along heater tubes 112. Thus, the working temperature is reached more swiftly. However, once that working temperature is reached, the flow restriction on the outlet 136 is substantially removed. This effect can be enhanced, if desired, by providing flow restrictions such as baffles within the tube 112b.

Figure 20:
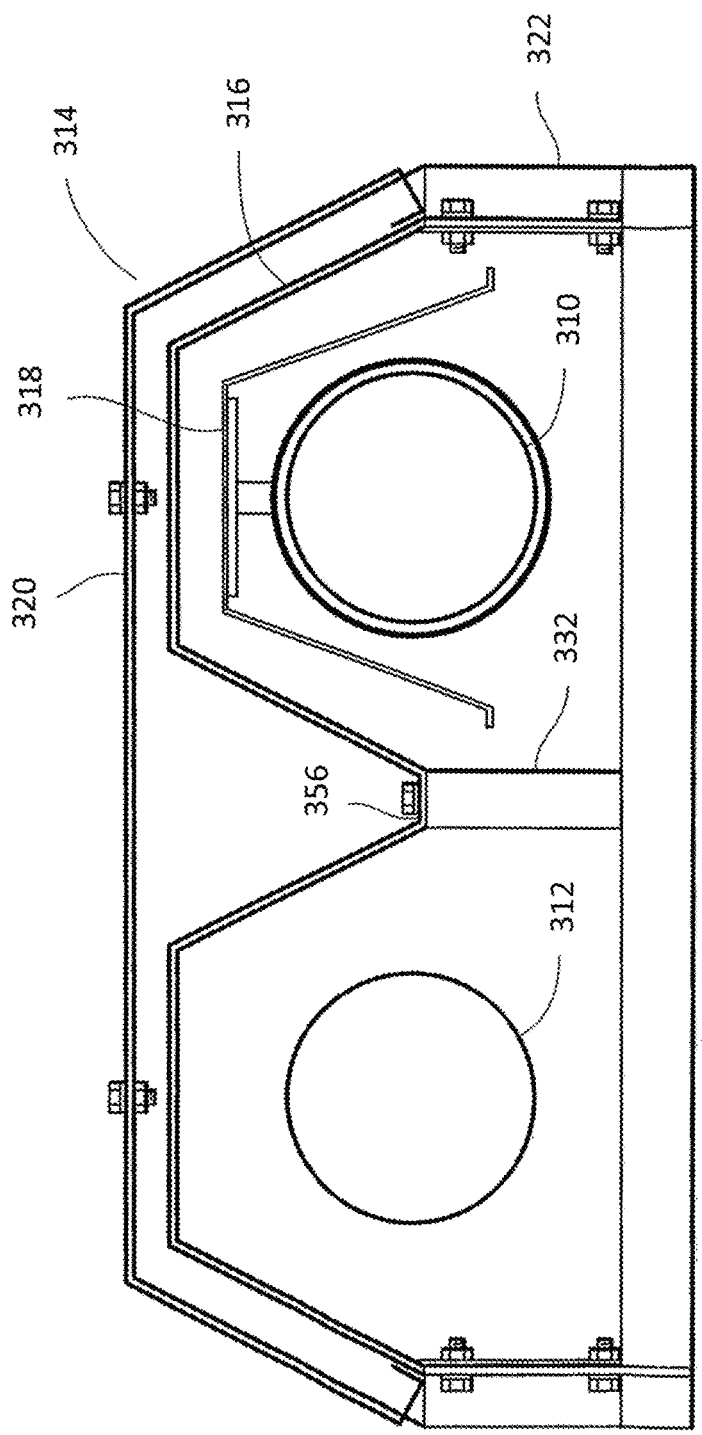
FIG. 20 is a sectional view of a known heater unit to which the redirecting element according to an embodiment of the disclosure can be applied.

Turning now to another known system, namely that disclosed in WO06/106345, referring first to FIG. 20, the radiant heater comprises two burner tubes 310, 312 located within a housing, generally designated 314. The housing 314 includes a reflector assembly 316, a deflector assembly 318 and a top cover assembly 320.

A bracket assembly 322 is provided at spaced (e.g. one meter) intervals along the housing 314.

Figure 21:
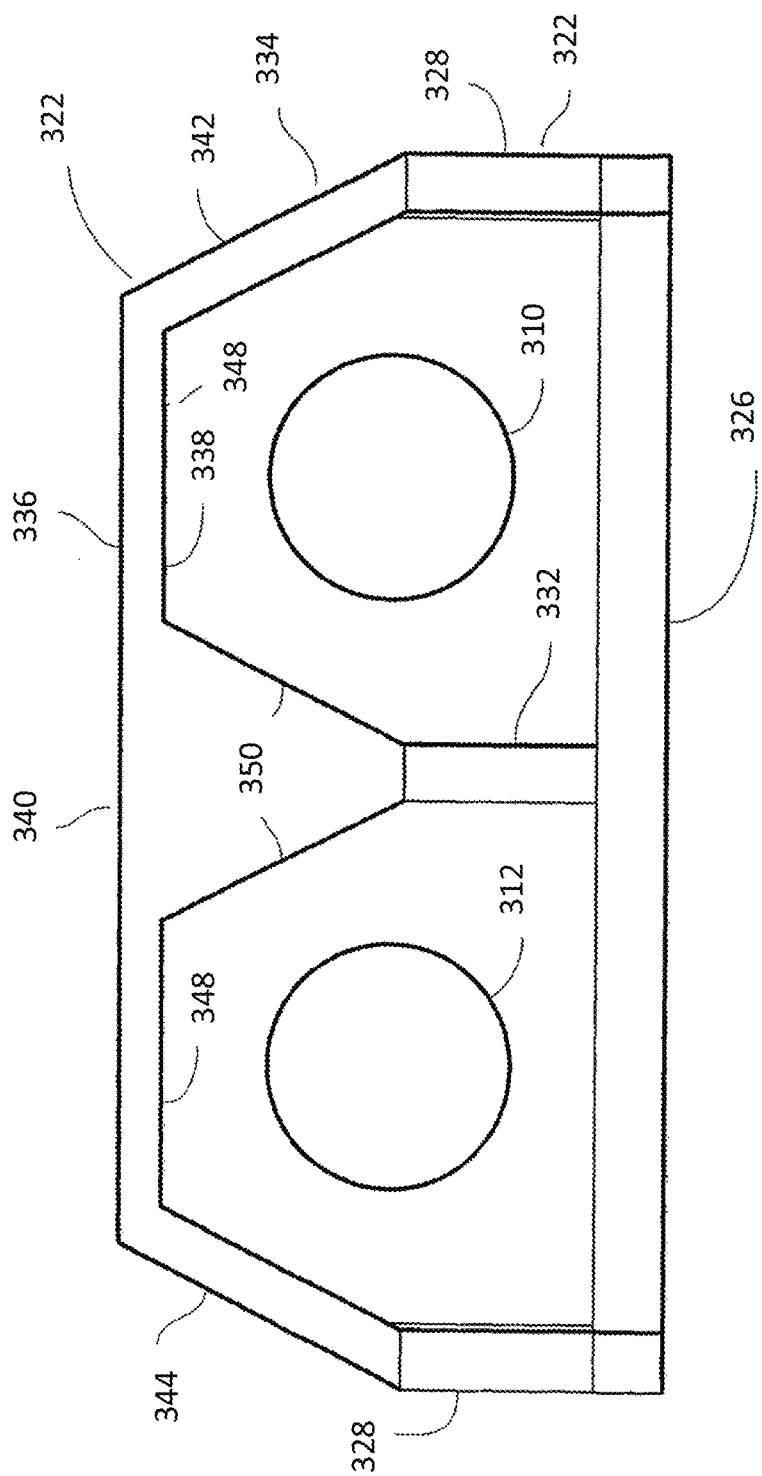
FIG. 21 is the view of FIG. 20 showing the bracket assembly.

Such a bracket assembly 322 is shown in FIG. 21.

The bracket assembly 322 comprises a lower bracket 324 which has a generally horizontal cross-bar portion 326 formed of box section steel and, secured thereto, by means of bolts (not shown), a generally upright member 328. At the midpoint of the cross-bar portion 330, is secured, by welding, a short transversally mounted piece of steel box section 332.

An upper bracket 334 has an outer wall 336 and an inner wall 338. The outer wall 336 is formed so as to have a generally horizontal region 340 and downwardly divergent portions 342 and 344. The ends of the divergent portions 342, 344 of the upper bracket 334 are secured to the upright members 328 of the lower bracket 324.

The inner wall 338 of the upper bracket 334 is shaped so as to have first and second horizontal regions 346, 348 divided by downwardly convergent members 350, the distal ends of which are secured to the steel box section 332 of the lower bracket 324.

Figure 22:
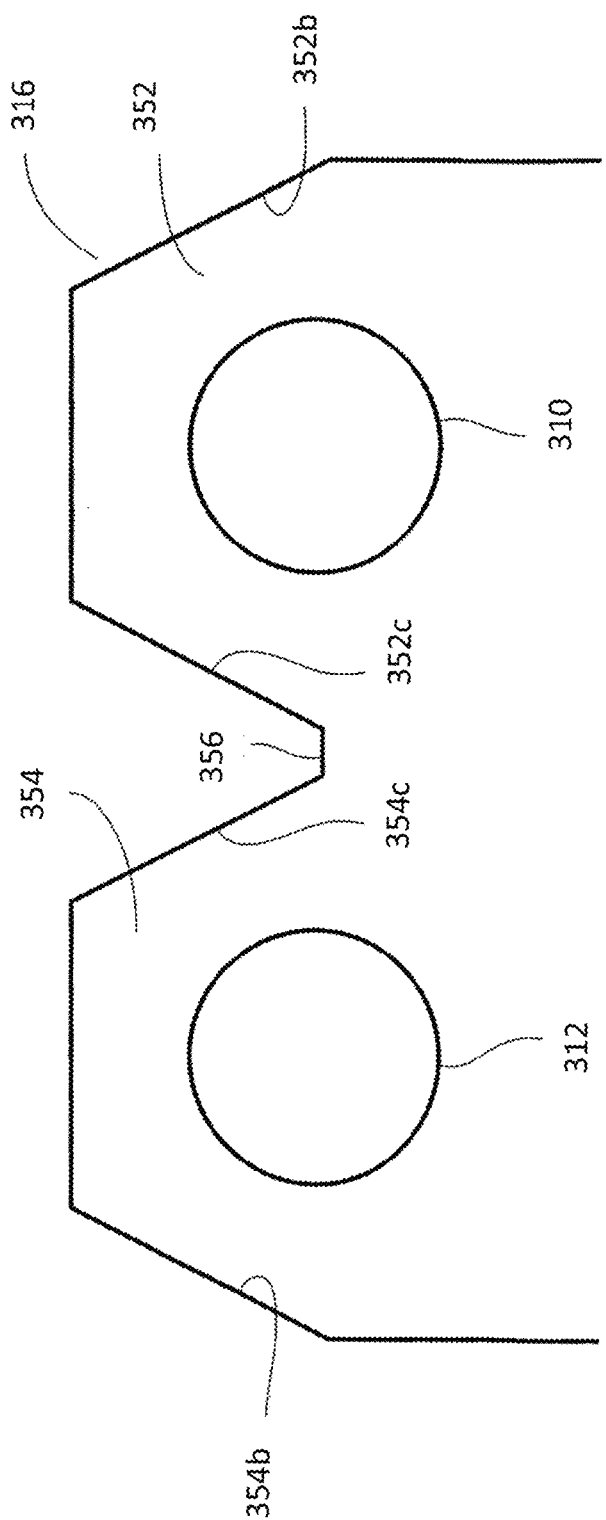
FIG. 22 is the view of FIG. 20 showing the reflector assembly.

The reflector assembly 316 is shown in FIG. 22. The reflector assembly 316 comprises a sheet of aluminium, the profile of which follows that of the inner wall 338 of the upper bracket 334. The reflector 316 is attached to the inner wall of the upright members 322 of the lower bracket and the top surface of the box section 332 via a nut and bolt, or similar, mechanism.

The reflector 316, once installed as part of the housing 310 therefore defines two downwardly open-sub channels 352, 354, each having an upper reflective surface 352a, 354a and downwardly divergent lateral reflective surfaces 352b, 352c, 354b, 354c. Surfaces 352c and 354c are linked together via a linking wall 356 which is bolted to the top surface of the box section 332.

Figure 23:
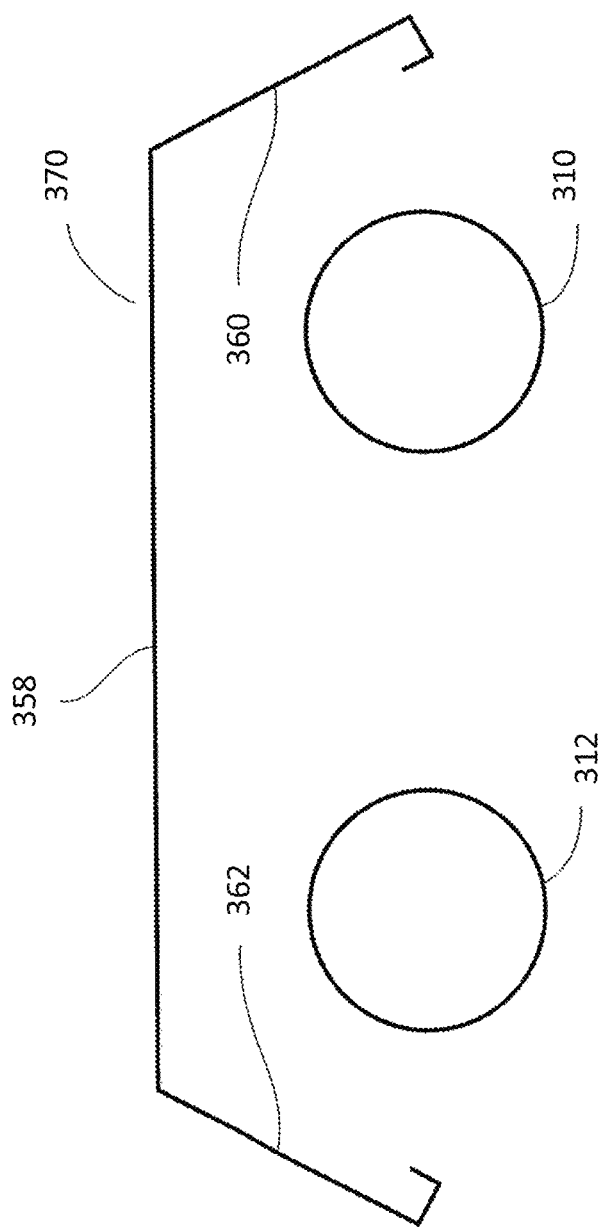
FIG. 23 is the view of FIG. 20 showing the top cover.

The top cover assembly 320 is shown in FIG. 23. The cover 320 comprises a sheet of mild steel which has a generally horizontal region 358 extending to downwardly divergent portions 360, 362. The cover 320 is bolted to the outer wall 336 of the upper bracket 334 so as to suspend approximately 1.5 to 2.5 cm above the reflector 316. No insulation is provided between the cover 320 and the reflector 316. As a result, the temperature of combustion air entering the burner is increased by absorbing additional heat from the entire top surface of the reflector 16 which, in turn substantially increases the flame temperature. This has the effect of markedly improving the output of the heater (by some 10 to 15%) and thus the efficiency and overall performance of the system as the total radiant heat output of a heater is proportionate to the overall temperature of the tubes 310, 312 within the system.

Figure 24:
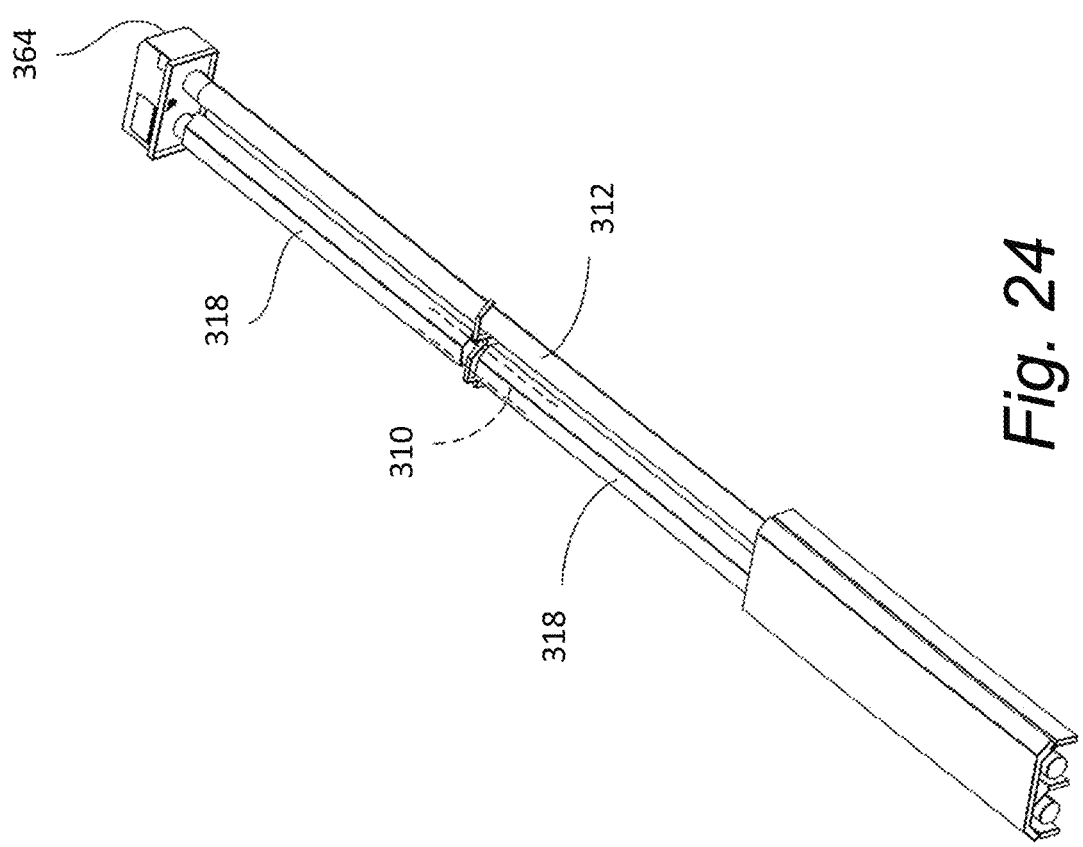
FIG. 24 is perspective view from above of the burner tubes of FIG. 20.

Referring now to FIG. 24, the burner tubes 310, 312 extend along the channels 352, 354 from one end of the housing 314 to the other. Tube 310 is connected at one end to a gas burner 364 which heats the interior of the tube 310. Combustion gases are drawn along the tube 310 from the burner 364 via a U-bend (not shown) and into the return tube 312 by means of an extraction fan (not shown) mounted at one end.

The tubes 310, 312 are formed from steel or the like, and may be surface treated to maximise their radiative efficiency. In use, the tube 310 is heated by means of the gas burner 364 and then functions as a radiator heating element. Tube 312 also gives out radiation, but to a lesser extent since the tube is somewhat cooler than tube 310.

In the present system, the heater operates at a higher temperature than can usually be expected in similar systems, such as that described in the Applicant's previous patents. A hot-spot, well in excess of 640° C., occurs along the tube 310 approximately 1.5 m from the burner 364 for a distance of approximately 1 m. The heat emitted at this hot-spot would ordinarily cause damage and distortion to the aluminium reflector 316 above the tube 310 in that region, particularly when the heater system is in operation for long periods.

To prevent such distortion, then housing 314 includes a deflector assembly 318 located above the tube 310 extending along the length of the hot-spot region. The deflector assembly 318 is best shown in FIG. 25. Here, it can be seen that a "T-shaped" mounting bracket 366 is secured to the top side of the tube 310 to extend upwardly therefrom. Several mounting brackets 366 are located at spaced intervals along the tube in the hot-spot region to allow a stainless steel deflector 318 to extend along the tube 310 across the hot-spot region, As can be seen in FIG. 5, the deflector 318 comprises two adjacent heat dissipation profiled panels of stainless steel, each of around 2.2 m in length.

The deflectors 318 act to absorb and dissipate the radiant heat emitted from the tube 310, and particularly its top surface, over the hot-spot region to deflect the radiant heat from reflector 316 in that region, thus preventing the intense heat from directly reaching the reflector 316. The deflectors 318 are profiled so as to have a generally horizontal top surface 368 (to cover the top surface of the tube 310) and two divergent downwardly extending surfaces (to cover the side surfaces of the tube 310 thereby to prevent intense radiant heat from directly reaching the adjacent cooler tube 312 and the reflector linking wall 356.

The presence of the deflector assembly 318 has been found to increase the overall efficiency of the heating system whilst preventing damage and distortion to parts of the housing 314.

The tubes 310, 312 are supported within the housing by tube-supporting cables as detailed in Applicants earlier U.S. Pat. No. 6,138,662 which is incorporated herein by reference.

It will be understood, that the various embodiments described herein have been described by way of example only and that modifications may be made thereto without departing from the spirit and scope of the present invention as defined in the accompanying claims.

The invention claimed is:

1. A radiant heater comprising:
a radiant heating element in the form of a tube having first and second ends, wherein the tube consists of first and second substantially straight sections generally parallel to one another, connected by a U-shaped tube;
a burner communicating with the first end of the tube for delivering combustion gases into the first straight section; and
a redirecting element which is disposed in the first straight section so as to redirect, in use, at least a portion of the combustion gases flowing within the upper half of the first section of the tube towards the lower half of said section of the tube;
wherein the radiant heater comprises an extractor communicating with the second end of the tube for extracting gases from the second straight section; and
wherein said redirecting element comprises at least one pair of longitudinally extending helical vanes, each pair being arranged diametrically opposite one another, the first longitudinally extending vane with a surface that extends downwards from the upper half of the first section of the tube into the lower half of said section of the tube, and the second vane of the or each pair having a surface that extends upwards from the lower half of the first section of the tube into the upper half of said section of the tube, wherein the or each pair of vanes are supported on a longitudinal post that extends centrally within the tube; and
wherein a fore end of the post has a cone arranged in use to urge gases being drawn towards the redirecting element outwards towards the vanes.

2. The radiant heater according to claim 1, wherein each vane makes a turn of approximately 180° along its length.

3. The radiant heater according to claim 1, wherein a spacer is provided on the post, of substantially the same diameter as the tube's inner diameter, so that the post is aligned centrally within the first section of the tube.

4. The radiant heater according to claim 1, wherein the redirecting element is removably located within the first section of the tube.

5. The radiant heater according to claim 1, wherein first and second adjacent redirecting elements are provided within the first section of the tube.

6. The radiant heater according to claim 5, wherein the first and second redirecting elements are supported on a single longitudinal post.

7. The radiant heater according to claim 1, further comprising a housing, the underside of which is recessed to receive the radiant heating element which is disposed beneath the housing such that its upper half is wholly within the recess, and at least a portion of its lower half protrudes downwardly from the recess, the recess having a heat reflective surface for reflecting heat radiation from the heating element in a downwards direction.

* * * * *